(12) United States Patent  
Purnadi et al.

(10) Patent No.: US 8,750,179 B2  
(45) Date of Patent: Jun. 10, 2014

(54) EFFICIENT MULTIMEDIA BROADCAST MULTICAST SERVICE CONTINUITY METHODS

(75) Inventors: Rene Waraputra Purnadi, Irving, TX (US); Zhijun Cai, Euless, TX (US); Richard Charles Burbidge, Hook (GB); Takashi Suzuki, Ichikawa (JP)

(73) Assignee: BlackBerry Limited, Waterloo, Ontario (CA)

( * ) Notice: Subject to any disclaimer, the term of this patent is extended or adjusted under 35 U.S.C. 154(b) by 165 days.

(21) Appl. No.: 13/209,927

(22) Filed: Aug. 15, 2011

(65) Prior Publication Data

US 2013/0044668 A1 Feb. 21, 2013

(51) Int. Cl.
*H04B 7/00* (2006.01)
*H04W 36/00* (2009.01)
*H04W 72/00* (2009.01)

(52) U.S. Cl.
CPC ........ *H04W 36/0055* (2013.01); *H04W 72/005* (2013.01)
USPC .......................................................... 370/310

(58) Field of Classification Search
USPC .................. 370/310, 328, 329, 331; 455/403, 455/422.1, 436, 442
See application file for complete search history.

(56) References Cited

U.S. PATENT DOCUMENTS

| | | | |
|---|---|---|---|
| 5,444,763 A | 8/1995 | Lazaridis et al. | |
| 6,563,794 B1 | 5/2003 | Takashima et al. | |
| 6,909,703 B2 | 6/2005 | Terry et al. | |
| 7,065,063 B2 | 6/2006 | Tran | |
| 7,158,801 B1 | 1/2007 | Muhonen | |
| 7,162,242 B2 | 1/2007 | Zhao et al. | |
| 7,184,708 B1 | 2/2007 | Kwa et al. | |
| 7,184,766 B2 | 2/2007 | Roberts | |
| 7,423,973 B2 | 9/2008 | Chen et al. | |
| 7,463,887 B2 | 12/2008 | Roberts et al. | |
| 7,471,948 B2 | 12/2008 | Farnsworth et al. | |
| 7,505,611 B2 | 3/2009 | Fyke | |
| 7,747,256 B2 | 6/2010 | Hanov et al. | |
| 7,747,275 B2 | 6/2010 | Funnell et al. | |

(Continued)

FOREIGN PATENT DOCUMENTS

EP 1475984 A1 11/2004
EP 1499061 A1 1/2005

(Continued)

OTHER PUBLICATIONS

Cai, Zhijun, U.S. Appl. No. 11/737,977; Title: "Polling Method and Apparatus for Long Term Evolution Multimedia Broadcast Multicast Services"; Filing Date: Apr. 20, 2007.

(Continued)

*Primary Examiner* — Fan Ng
(74) *Attorney, Agent, or Firm* — Conley Rose, P.C.; J. Robert Brown, Jr.

(57) ABSTRACT

A method is provided for a UE to receive a MBMS. The method includes, when the UE initiates a handover from a first cell that is providing the MBMS, the UE adding a TMGI associated with the MBMS service to a message sent from the UE to an access node in the first cell. The method further comprises the UE receiving information from the access node in the first cell, the information promoting the UE being handed over to a second cell capable of providing the MBMS.

28 Claims, 18 Drawing Sheets

(56) References Cited

U.S. PATENT DOCUMENTS

| | | | |
|---|---|---|---|
| 7,751,403 B2* | 7/2010 | Kim et al. | 370/394 |
| 7,796,605 B2 | 9/2010 | Pecen et al. | |
| 7,805,155 B2* | 9/2010 | Chapman et al. | 455/525 |
| 7,813,261 B2 | 10/2010 | Ma et al. | |
| 7,889,689 B2 | 2/2011 | Sebire | |
| 8,089,911 B2 | 1/2012 | Huang et al. | |
| 8,208,498 B2* | 6/2012 | Kitazoe et al. | 370/509 |
| 8,208,561 B2 | 6/2012 | Horn et al. | |
| 8,254,932 B2* | 8/2012 | Hsu | 455/436 |
| 2001/0041025 A1 | 11/2001 | Farahi | |
| 2003/0086515 A1 | 5/2003 | Trans et al. | |
| 2003/0220119 A1 | 11/2003 | Terry | |
| 2003/0223394 A1 | 12/2003 | Parantainen et al. | |
| 2003/0228865 A1 | 12/2003 | Terry | |
| 2004/0131026 A1 | 7/2004 | Kim et al. | |
| 2004/0156332 A1 | 8/2004 | Terry et al. | |
| 2004/0224698 A1 | 11/2004 | Yi et al. | |
| 2005/0013326 A1 | 1/2005 | Vinagre | |
| 2005/0047359 A1 | 3/2005 | Sebire | |
| 2005/0135291 A1 | 6/2005 | Ketchum et al. | |
| 2005/0157666 A1 | 7/2005 | Terry et al. | |
| 2005/0169202 A1* | 8/2005 | Ratasuk et al. | 370/312 |
| 2005/0169205 A1 | 8/2005 | Grilli et al. | |
| 2005/0176404 A1 | 8/2005 | Hundscheidt et al. | |
| 2005/0216812 A1 | 9/2005 | Leon et al. | |
| 2005/0232271 A1 | 10/2005 | Kettunen et al. | |
| 2005/0232292 A1 | 10/2005 | Richards et al. | |
| 2005/0245265 A1 | 11/2005 | Nascimbene et al. | |
| 2006/0023652 A1 | 2/2006 | Vedantham et al. | |
| 2006/0088009 A1 | 4/2006 | Gibbs et al. | |
| 2006/0198377 A1 | 9/2006 | Kubota | |
| 2006/0203756 A1* | 9/2006 | Hu | 370/312 |
| 2006/0217119 A1 | 9/2006 | Bosch et al. | |
| 2006/0221888 A1 | 10/2006 | Sebire et al. | |
| 2006/0252439 A1 | 11/2006 | Cai | |
| 2007/0191020 A1 | 8/2007 | Fischer et al. | |
| 2007/0230380 A1 | 10/2007 | Bergstrom et al. | |
| 2007/0253432 A1 | 11/2007 | Regale et al. | |
| 2008/0032735 A1 | 2/2008 | Pecen | |
| 2008/0070581 A1 | 3/2008 | Charbit et al. | |
| 2008/0159324 A1 | 7/2008 | Bosch et al. | |
| 2008/0181161 A1 | 7/2008 | Gi Kim et al. | |
| 2008/0188228 A1 | 8/2008 | Pecen et al. | |
| 2008/0192669 A1 | 8/2008 | Hus et al. | |
| 2008/0233974 A1 | 9/2008 | Xu | |
| 2008/0267136 A1 | 10/2008 | Baker et al. | |
| 2010/0042882 A1 | 2/2010 | Randall | |
| 2010/0046632 A1 | 2/2010 | Horn et al. | |
| 2011/0149827 A1* | 6/2011 | Na et al. | 370/312 |
| 2011/0235539 A1* | 9/2011 | Cai et al. | 370/252 |
| 2011/0305183 A1* | 12/2011 | Hsu et al. | 370/312 |
| 2012/0039181 A1* | 2/2012 | Aziz et al. | 370/241 |
| 2012/0236776 A1* | 9/2012 | Zhang et al. | 370/312 |

FOREIGN PATENT DOCUMENTS

| | | |
|---|---|---|
| EP | 1499064 A1 | 1/2005 |
| EP | 1643786 A1 | 4/2006 |
| EP | 1650989 A1 | 4/2006 |
| EP | 1729535 A1 | 12/2006 |
| WO | 2004025978 A1 | 3/2004 |
| WO | 2005018107 A1 | 2/2005 |
| WO | 2005020520 A2 | 3/2005 |
| WO | 2005022835 A1 | 3/2005 |
| WO | 2005101738 A1 | 10/2005 |
| WO | 2005109925 A1 | 11/2005 |
| WO | 2011157216 A1 | 12/2011 |

OTHER PUBLICATIONS

Cai, Zhijun, U.S. Appl. No. 12/966,913; Title: "Polling Method and Apparatus for Long Term Evolution Multimedia Broadcast Multicast Services"; Filing Date: Dec. 13, 2010.

Cai, Zhijun, U.S. Appl. No. 13/315,004; Title: "Polling Method and Apparatus for Long Term Evolution Multimedia Broadcast Multicast Services"; Filing Date: Dec. 8, 2011.

Cai, Zhijun, U.S. Appl. No. 11/737,984; Title: "Multicast Control Channel Design"; Filing Date: Apr. 20, 2007.

Cai, Zhijun, U.S. Appl. No. 11/737,987; Title: "Method and Apparatus for User Equipment for Long Term Evolution Multimedia Broadcast Multicast Services"; Filing Date: Apr. 20, 2007.

3GPP TSG-RAN Meeting 51; "WID: Service Continuity and Location Information for MBMS for LTE"; Huawei; RP-110452; Kansas City, USA; Mar. 15-18, 2011; 6 pages.

3GPP TS 25.346, "3rd Generation Partnership Project; Technical Specification Group Radio Access Network; Introduction of the Multimedia Broadcast Multicast Service (MBMS) in the Radio Access Network (RAN); Stage 2 (Release 6)," Dec. 2005, 30 pages, V6.7.0 Technical Specification, 3GPP Organizational Partners.

3GPP TS 23.003 V10.2.0; 3rd Generation Partnership Project; Technical Specifcation Group Core Network and Terminals; Numbering, Addressing and Identification; Release 10; Jun. 2011; 80 pages.

3GPP TS 25.123 V10.1.0; 3rd Generation Partnership Project; Technical Specifcation Group Radio Access Network; Requirements for Support of Radio Resource Mangement (TDD); Release 10; Apr. 2011; 449 pages.

3GPP TS 33.401 V11.0.1; 3rd Generation Partnership Project; Technical Specifcation Group Services and System Aspects; 3GPP System Architecture Evolution (SAE); Security Architecture; Release 11; Jun. 2011; 115 pages.

3GPP TS 36.101 V10.2.1; 3rd Generation Partnership Project; Technical Specifcation Group Radio Access Network; Evolved Universal Terrestrial Radio Access (E-UTRA); User Equipment (UE) Radio Transmission and Reception; Release 10; Apr. 2011; 225 pages.

3GPP TS 36.133 V10.3.0; 3rd Generation Partnership Project; Technical Specifcation Group Radio Access Network; Evolved Universal Terrestrial Radio Access (E-UTRA); Requirements for Support of Radio Resource Management; Release 10; Jun. 2011; 457 pages.

3GPP TS 36.323 V10.1.0; 3rd Generation Partnership Project; Technical Specifcation Group Radio Access Network; Evolved Universal Terrestrial Radio Access (E-UTRA); Packet Data Convergence Protocol (PDCP) Specification; Release 10; Mar. 2011; 26 pages.

3GPP TS 36.331 V9.7.0; 3rd Generation Partnership Project; Technical Specifcation Group Radio Access Network; Evolved Universal Terrestrial Radio Access (E-UTRA); Radio Resource Control (RRC); Protocol Specification; Release 9; Jun. 2011; 253 pages.

3GPP TS 36.443 V10.2.0; 3rd Generation Partnership Project; Technical Specifcation Group Radio Access Network; Evolved Universal Terrestrial Radio Access Network (E-UTRAN); M2 Application Protocol (M2AP); Release 10; Jun. 2011; 84 pages.

3GPP TS 36.444 V10.2.0; 3rd Generation Partnership Project; Technical Specifcation Group Radio Access Network; Evolved Universal Terrestrial Radio Access Network (E-UTRAN); M3 Application Protocol (M3AP); Release 10; Jun. 2011; 53 pages.

3GPP TS 45.008 V10.1.0; 3rd Generation Partnership Project; Technical Specifcation Group GSM/EDGE Radio Access Network; Radio Subsystem Link Control; Release 10; May 2011; 151 pages.

Office Action dated Feb. 19, 2010; U.S. Appl. No. 11/737,977, filed Apr. 20, 2007; 35 pages.

Notice of Allowance dated Aug. 9, 2010; U.S. Appl. No. 11/737,977, filed Apr. 20, 2007; 12 pages.

Office Action dated Mar. 22, 2011; U.S. Appl. No. 12/966,913, filed Dec. 13, 2010; 14 pages.

Interview Summary dated Sep. 8, 2011; U.S. Appl. No. 12/966,913, filed Dec. 13, 2010; 3 pages.

Notice of Allowance dated Oct. 11, 2011; U.S. Appl. No. 12/966,913, filed Dec. 13, 2010; 14 pages.

Office Action dated Oct. 23, 2009; U.S. Appl. No. 11/737,987, filed Apr. 20, 2007; 13 pages.

Final Office Action dated Apr. 12, 2010; U.S. Appl. No. 11/737,987, filed Apr. 20, 2007; 7 pages.

Advisory Action dated Jul. 8, 2010; U.S. Appl. No. 11/737,987, filed Apr. 20, 2007; 3 pages.

Office Action dated Sep. 21, 2010; U.S. Appl. No. 11/737,987, filed Apr. 20, 2007; 8 pages.

(56) References Cited

OTHER PUBLICATIONS

Final Office Action dated Mar. 21, 2011; U.S. Appl. No. 11/737,987, filed Apr. 20, 2007; 14 pages.
European Examination Report dated Dec. 18, 2007; EP07109014.6; 9 pgs.
European Second Examination Report dated Aug. 1, 2008; EP07109014.6; 4 pgs.
European Communication—Summons to Attend Oral Proceedings dated Jun. 9, 2009; EP07109014.6; 14 pgs.
PCT International Search Report; PCT Application No. PCT/CA2008/000760; Aug. 8, 2008; 3 pgs.
PCT Written Opinion of the International Searching Authority; PCT Application No. PCT/CA2008/000760; Aug. 8, 2008; 6 pgs.
PCT Notification of Transmittal of International Preliminary Report on Patentability ; PCT Application No. PCT/CA2008/000760; Sep. 9, 2009; 11 pgs.
European Search and Examination Report dated Mar. 16, 2010; EP Application No. 08733776.2; 8 pgs.
European Communication dated Apr. 6, 2010; EP Application No. 08733776.2; 1 pg.
European Decision to Grant dated Feb. 3, 2011; EP Application No. 08733776.2; 1 page.
Extended European Search Report dated May 11, 2011; EP Application No. 11151733.0; 7 pages.
European Search Report dated Sep. 11, 2007; EP Application No. EP 07109015.3; 6 pgs.
European Notice of Allowance dated Aug. 25, 2009; EP Application No. EP 07109015.3; 29 pgs.
PCT International Search Report; PCT Application No. PCT/CA2008/000759; Aug. 8, 2008; 3 pgs.
PCT Written Opinion of the International Searching Authority; PCT Application No. PCT/CA2008/000759; Aug. 8, 2008; 5 pgs.
PCT International Preliminary Report on Patentability; PCT Application No. PCT/CA2008/000759; Aug. 31, 2009; 6 pgs.
Final Office Action dated Jul. 5, 2011; U.S. Appl. No. 12/966,913, filed Dec. 13, 2010; 8 pages.
Office Action dated Mar. 1, 2012; U.S. Appl. No. 13/315,004, filed Dec. 8, 2011; 25 pages.
Office Action dated Jul. 12, 2011; U.S. Appl. No. 11/737,987, filed Apr. 20, 2007; 12 pages.
Office Action dated Jan. 31, 2012; U.S. Appl. No. 11/737,987, filed Apr. 20, 2007; 17 pages.
Notice of Allowance dated Jun. 6, 2012; U.S. Appl. No. 13/315,004, filed Dec. 8, 2011; 13 pages.
3GPP TS 36.443 V10.1.0; 3rd Generation Partnership Project; Technical Specification Group Radio Access Network; Evolved Universal Terrestrial Radio Access Network (E-UTRAN); M2 Application Protocol (M2AP); Release 10; Mar. 2011; 84 pages.
3GPP TSG RAN WG2 #73bis; "Service Continuity Scenario Analysis"; R2-111925; Shanghai, China; Apr. 11-15, 2011; 4 pages.
3GPP TSG-RAN WG2 Meeting #74; "Service Continuity Support for RRC Connected UE"; R2-113135; Barcelona, Spain; May 9-13, 2011; 3 pages.
3GPP TS 36.440 V10.0.1; 3rd Generation Partnership Project; Technical Specification Group Radio Access Network; Evolved Universal Terrestrial Radio Access Network (E-UTRAN); Multimedia Broadcast Multicast Service (MBMS) within E-UTRAN; Release 10; Mar. 2011; 11 pages.
3GPP TSG RAN WG2 #74; "Enhancing MBMS Service Continuity"; R2-113878; Athens; Aug. 20-24, 2011; 2 pages.
PCT International Search Report; Application No. PCT/US2011/065531; May 31, 2012; 6 pages.
PCT Written Opinion of the International Searching Authority; Application No. PCT/US2011/065531; May 31, 2012; 14 pages.
Canadian Office Action; Application No. 2,684,396; Aug. 7, 2012; 3 pages.
Office Action dated Feb. 7, 2013; U.S. Appl. No. 11/737,987, filed Apr. 20, 2007; 18 pages.
Office Action dated Jul. 11, 2013; U.S. Appl. No. 11/737,987, filed Apr. 20, 2007; 23 pages.
Final Office Action dated Oct. 24, 2013; U.S. Appl. No. 11/737,987, filed Apr. 20, 2007; 24 pages.
Advisory Action dated Jan. 2, 2014; U.S. Appl. No. 11/737,987, filed Apr. 20, 2007; 4 pages.
Notice of Allowance dated Mar. 6, 2014; U.S. Appl. No. 11/737,987, filed Apr. 20, 2007; 10 pages.

\* cited by examiner

| UE's TMGI | cell1 | cell2 | cell3 | cell4 |
|---|---|---|---|---|
| MBSFN1 | MBSFN1 | MBSFN1 | | MBSFN1 |
| | MBSFN2 | MBSFN2 | MBSFN2 | |
| MBSFN3 | | MBSFN3 | | MBSFN3 |
| | | MBSFN4 | MBSFN4 | MBSFN4 |

Figure 2

```
-- ASN1START

MeasConfig ::=                      SEQUENCE {
    -- Measurement objects
    measObjectToRemoveList          MeasObjectToRemoveList          OPTIONAL,   -- Need ON
    measObjectToAddModList          MeasObjectToAddModList          OPTIONAL,   -- Need ON
    -- Reporting configurations
    reportConfigToRemoveList        ReportConfigToRemoveList        OPTIONAL,   -- Need ON
    reportConfigToAddModList        ReportConfigToAddModList        OPTIONAL,   -- Need ON
    -- Measurement identities
    measIdToRemoveList              MeasIdToRemoveList              OPTIONAL,   -- Need ON
    measIdToAddModList              MeasIdToAddModList              OPTIONAL,   -- Need ON
    -- Other parameters
    quantityConfig                  QuantityConfig                  OPTIONAL,   -- Need ON
    measGapConfig                   MeasGapConfig                   OPTIONAL,   -- Need ON
    s-Measure                       RSRP-Range                      OPTIONAL,   -- Need ON
    preRegistrationInfoHRPD         PreRegistrationInfoHRPD         OPTIONAL,   -- Need OP
    speedStatePars          CHOICE {
        release                     NULL,
        setup                       SEQUENCE {
            mobilityStateParameters     MobilityStateParameters,
            timeToTrigger-SF            SpeedStateScaleFactors
        }
    }                                                               OPTIONAL,   -- Need ON
    ...,
    [[ tmgi-Reporting-r11           ENUMERATED {true}               OPTIONAL    -- Need OR
    ]]
}

MeasIdToRemoveList ::=              SEQUENCE (SIZE (1..maxMeasId)) OF MeasId

MeasObjectToRemoveList ::=          SEQUENCE (SIZE (1..maxObjectId)) OF MeasObjectId ReportConfigToRemoveList ::=        SEQUENCE (SIZE (1..maxReportConfigId)) OF ReportConfigId

-- ASN1STOP
```

Figure 7a

| MeasConfig field descriptions |
|---|
| measGapConfig<br>Used to setup and release measurement gaps. |
| measIdToRemoveList<br>List of measurement identities to remove. |
| measObjectToRemoveList<br>List of measurement objects to remove. |
| PreRegistrationInfoHRPD<br>The CDMA2000 HRPD Pre-Registration Information tells the UE if it should pre-register with the CDMA2000 HRPD network and identifies the Pre-registration zone to the UE. |
| reportConfigToRemoveList<br>List of measurement reporting configurations to remove. |
| s-Measure<br>PCell quality threshold controlling whether or not the UE is required to perform measurements of intra-frequency, inter-frequency and inter-RAT neighboring cells. Value "0" indicates to disable *s-Measure*. |
| timeToTrigger-SF<br>The *timeToTrigger* in *ReportConfigEUTRA* and in *ReportConfigInterRAT* are multiplied with the scaling factor applicable for the UE's speed state. |
| tmgi-Reporting-r11<br>The indication whether TMGI is included in the measurement report. |

Figure 7b

```
-- ASN1START

MeasResults ::=                         SEQUENCE {
    measId                                  MeasId,
    measResultPCell                         SEQUENCE {
        rsrpResult                              RSRP-Range,
        rsrqResult                              RSRQ-Range
    },
    measResultNeighCells                    CHOICE {
        measResultListEUTRA                     MeasResultListEUTRA,
        measResultListUTRA                      MeasResultListUTRA,
        measResultListGERAN                     MeasResultListGERAN,
        measResultsCDMA2000                     MeasResultsCDMA2000,
        ...
    }                                                                           OPTIONAL,
    ...,
    [[ measResultForECID-r9                 MeasResultForECID-r9                OPTIONAL
    ]],
    [[ locationInfo-r10                     LocationInfo-r10                    OPTIONAL,
       measResultServFreqList-r10           MeasResultServFreqList-r10          OPTIONAL
    ]],
    [[ tmgi-List-r11                        TMGI-List-r11                       OPTIONAL
    ]]
}

MeasResultListEUTRA ::=                 SEQUENCE (SIZE (1..maxCellReport)) OF MeasResultEUTRA MeasResultEUTRA ::= SEQUENCE {
    physCellId                              PhysCellId,
    cgi-Info                                SEQUENCE {
        cellGlobalId                            CellGlobalIdEUTRA,
        trackingAreaCode                        TrackingAreaCode,
        plmn-IdentityList                       PLMN-IdentityList2                  OPTIONAL
    }                                                                           OPTIONAL,
    measResult                              SEQUENCE {
        rsrpResult                              RSRP-Range                          OPTIONAL,
        rsrqResult                              RSRQ-Range                          OPTIONAL,
        ...,
        [[ additionalSI-Info-r9                 AdditionalSI-Info-r9                OPTIONAL
        ]]
    }
}

MeasResultServFreqList-r10 ::=          SEQUENCE (SIZE (1..maxServCell-r10)) OF MeasResultServFreq-r10

MeasResultServFreq-r10 ::=              SEQUENCE {
    servFreqId-r10                          ServCellIndex-r10,
    measResultSCell-r10                     SEQUENCE {
        rsrpResultSCell-r10                     RSRP-Range,
        rsrqResultSCell-r10                     RSRQ-Range
    }                                                                           OPTIONAL,
    measResultBestNeighCell-r10             SEQUENCE {
        physCellId-r10                          PhysCellId,
        rsrpResultNCell-r10                     RSRP-Range,
        rsrqResultNCell-r10                     RSRQ-Range
    }                                                                           OPTIONAL,
    ...
}

MeasResultListUTRA ::=                  SEQUENCE (SIZE (1..maxCellReport)) OF MeasResultUTRA MeasResultUTRA ::=   SEQUENCE {
    physCellId                              CHOICE {
        fdd                                     PhysCellIdUTRA-FDD,
        tdd                                     PhysCellIdUTRA-TDD
    },
    cgi-Info                                SEQUENCE {
        cellGlobalId                            CellGlobalIdUTRA,
        locationAreaCode                        BIT STRING (SIZE (16))              OPTIONAL,
        routingAreaCode                         BIT STRING (SIZE (8))               OPTIONAL,
        plmn-IdentityList                       PLMN-IdentityList2                  OPTIONAL
```

Figure 8a

```
}                                                        OPTIONAL,
    measResult                       SEQUENCE {
        utra-RSCP                        INTEGER (-5..91)            OPTIONAL,
        utra-EcN0                        INTEGER (0..49)             OPTIONAL,
        ...,
        [[ additionalSI-Info-r9          AdditionalSI-Info-r9              OPTIONAL
        ]]
    }
}

MeasResultListGERAN ::=             SEQUENCE (SIZE (1..maxCellReport)) OF MeasResultGERAN MeasResultGERAN ::= SEQUENCE {
    carrierFreq                      CarrierFreqGERAN,
    physCellId                       PhysCellIdGERAN,
    cgi-Info                         SEQUENCE {
        cellGlobalId                     CellGlobalIdGERAN,
        routingAreaCode                  BIT STRING (SIZE (8))       OPTIONAL
    }                                                                OPTIONAL,
    measResult                       SEQUENCE {
        rssi                             INTEGER (0..63),
        ...
    }
}

MeasResultsCDMA2000 ::=             SEQUENCE {
    preRegistrationStatusHRPD           BOOLEAN,
    measResultListCDMA2000              MeasResultListCDMA2000
}

MeasResultListCDMA2000 ::=          SEQUENCE (SIZE (1..maxCellReport)) OF MeasResultCDMA2000

MeasResultCDMA2000 ::=   SEQUENCE {
    physCellId                       PhysCellIdCDMA2000,
    cgi-Info                         CellGlobalIdCDMA2000            OPTIONAL,
    measResult                       SEQUENCE {
        pilotPnPhase                     INTEGER (0..32767)          OPTIONAL,
        pilotStrength                    INTEGER (0..63),
        ...
    }
}

MeasResultForECID-r9 ::=            SEQUENCE {
    ue-RxTxTimeDiffResult-r9            INTEGER (0..4095),
    currentSFN-r9                       BIT STRING (SIZE (10))
}

PLMN-IdentityList2 ::=              SEQUENCE (SIZE (1..5)) OF PLMN-Identity

AdditionalSI-Info-r9 ::=            SEQUENCE {
    csg-MemberStatus-r9                 ENUMERATED {member}          OPTIONAL,
    csg-Identity-r9                     CSG-Identity                 OPTIONAL
}

TMGI-List-r11 ::=                   SEQUENCE (SIZE (1..16)) OF TMGI-r9

-- ASN1STOP
```

Figure 8b

| MeasResults field descriptions |
|---|
| measId |
| Identifies the measurement identity for which the reporting is being performed. |
| measResult |
| Measured result of an E-UTRA cell;<br>Measured result of a UTRA cell;<br>Measured result of a GERAN cell or frequency; or<br>Measured result of a CDMA2000 cell.<br>Measured result of UE Rx–Tx time difference. |
| measResultListCDMA2000 |
| List of measured results for the maximum number of reported best cells for a CDMA2000 measurement identity. |
| measResultListEUTRA |
| List of measured results for the maximum number of reported best cells for an E-UTRA measurement identity. |
| measResultListGERAN |
| List of measured results for the maximum number of reported best cells or frequencies for a GERAN measurement identity. |
| measResultListUTRA |
| List of measured results for the maximum number of reported best cells for a UTRA measurement identity. |
| measResultPCell |
| Measured result of the PCell. |
| measResultsCDMA2000 |
| Contains the CDMA2000 HRPD pre-registration status and the list of CDMA2000 measurements. |
| csg-MemberStatus |
| Indicates whether or not the UE is a member of the CSG of the neighbour cell. |
| currentSFN |
| Indicates the current system frame number when receiving the UE Rx-Tx time difference measurement results from lower layer. |
| locationAreaCode |
| A fixed length code identifying the location area within a PLMN, as defined in TS 23.003 [27]. |
| MeasResultServFreqList |
| Measured results of the serving frequencies: the measurement result of each SCell, if any, and of the best neighbouring cell on each serving frequency. |
| tmgi-List-R11 |
| the TMGI parameters indicating the TMGI(s) that the UE is receiving or interested to receive. If absent, the UE is neither receiving nor interested to receive an MBMS service |
| pilotPnPhase |
| Indicates the arrival time of a CDMA2000 pilot, measured relative to the UE's time reference in units of PN chips, see C.S0005-A [25]. This information is used in either SRVCC handover or enhanced 1xRTT CS fallback procedure to CDMA2000 1xRTT. |
| pilotStrength |
| CDMA2000 Pilot Strength, the ratio of pilot power to total power in the signal bandwidth of a CDMA2000 Forward Channel. See C.S0005-A [25] for CDMA2000 1xRTT and C.S0024-A [26] for CDMA2000 HRPD. |
| plmn-IdentityList |
| The list of PLMN Identity read from broadcast information when the multiple PLMN Identities are broadcast. This field contains the list of identities starting from the second entry of PLMN Identities in the broadcast information. |
| preRegistrationStatusHRPD |
| Set to TRUE if the UE is currently pre-registered with CDMA2000 HRPD. Otherwise set to FALSE. This can be ignored by the eNB for CDMA2000 1xRTT. |

Figure 8c

| |
|---|
| *routingAreaCode* <br> The RAC identity read from broadcast information, as defined in TS 23.003 [27]. |
| *rsrpResult* <br> Measured RSRP result of an E-UTRA cell. <br> The rsrpResult is only reported if configured by the eNB. |
| *rsrqResult* <br> Measured RSRQ result of an E-UTRA cell. <br> The rsrqResult is only reported if configured by the eNB. |
| *rssi* <br> GERAN Carrier RSSI. RXLEV is mapped to a value between 0 and 63, TS 45.008 [28]. When mapping the RXLEV value to the RSSI bit string, the first/leftmost bit of the bit string contains the most significant bit. |
| *ue-RxTxTimeDiffResult* <br> UE Rx-Tx time difference measurement result of the PCell, provided by lower layers. According to UE Rx-Tx time difference report mapping in TS 36.133 [16]. |
| *utra-EcN0* <br> According to CPICH_Ec/No in TS 25.133 [29] for FDD. Fourteen spare values. The field is not present for TDD. |
| *utra-RSCP* <br> According to CPICH_RSCP in TS 25.133 [29] for FDD and P-CCPCH_RSCP in TS 25.123 [30] for TDD. Thirty-one spare values. |

Figure 8d

```
MobilityControlInfo ::=         SEQUENCE {
    targetPhysCellId                PhysCellId  carrierFreq
    CarrierFreqEUTRA                OPTIONAL,       -- Cond HO-toEUTRA
    carrierBandwidth                CarrierBandwidthEUTRA           OPTIONAL,       -- Cond
HO-toEUTRA
    additionalSpectrumEmission      AdditionalSpectrumEmission      OPTIONAL,       -- Cond
HO-toEUTRA
    t304                            ENUMERATED {
                                        ms50, ms100, ms150, ms200, ms500, ms1000,
                                        ms2000, spare1},
    newUE-Identity                  C-RNTI,
    radioResourceConfigCommon       RadioResourceConfigCommon,
    rach-ConfigDedicated            RACH-ConfigDedicated,           OPTIONAL,       -- Need
OP
    tmgi-List-r11                   TMGI-List-r11                   OPTIONAL
    ...
}

CarrierBandwidthEUTRA ::=       SEQUENCE {
    dl-Bandwidth                    ENUMERATED {
                                        n6, n15, n25, n50, n75, n100, spare10,
                                        spare9, spare8, spare7, spare6, spare5,
                                        spare4, spare3, spare2, spare1},
    ul-Bandwidth                    ENUMERATED {
                                        n6, n15, n25, n50, n75, n100, spare10,
                                        spare9, spare8, spare7, spare6, spare5,
                                        spare4, spare3, spare2, spare1} OPTIONAL -- Need
OP
}

CarrierFreqEUTRA ::=            SEQUENCE {
    dl-CarrierFreq                  ARFCN-ValueEUTRA,
    ul-CarrierFreq                  ARFCN-ValueEUTRA                OPTIONAL        -- Cond FDD
}

TMGI-List-r11 ::=               SEQUENCE (SIZE (1..16)) OF TMGI-r9
```

| MobilityControlInfo field descriptions |
| --- |
| t304 |
| Timer T304 as described in section 7.3. ms50 corresponds with 50 ms, ms100 corresponds with 100 ms and so on. |
| dl-Bandwidth |
| Parameter: *Downlink bandwidth*, see TS 36.101 [42]. |
| ul-Bandwidth |
| Parameter: *Uplink bandwidth*, see TS 36.101 [42, table 5.6-1]. For TDD, the parameter is absent and it is equal to downlink bandwidth. If absent for FDD, apply the same value as applies for the downlink bandwidth. |
| rach-ConfigDedicated |
| The dedicated random access parameters. If absent the UE applies contention based random access as specified in TS 36.321 [6]. |
| tmgi-List-R11 |
| the TMGI parameters indicating the TMGI(s) that the target cell can provide among the TMGI(s) that UE is receiving or interested to receive as sent in measurement report. If absent, the target cell does not provide any corresponding TMGI that the UE is receiving or interested to receive |
| carrierBandwidth |
| Provides the parameters *Downlink bandwidth*, and *Uplink bandwidth*, see TS 36.101 [42]. |

| Conditional presence | Explanation |
| --- | --- |
| FDD | The field is mandatory with default value (the default duplex distance defined for the concerned band, as specified in TS 36.101 [42]) in case of "FDD"; otherwise the field is not present. |
| HO-toEUTRA | The field is mandatory present in case of inter-RAT handover to E-UTRA; otherwise the field is optionally present, need ON. |

Figure 9

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MCE MBMS M2AP ID | M | | 9.2.3.1 | | YES | ignore |
| eNB MBMS M2AP ID | M | | 9.2.3.2 | | YES | ignore |
| TMGI(s) | M | | 9.a.b.c | | YES | ignore |
| Criticality Diagnostics | O | | 9.2.1.7 | | YES | ignore |

Figure 11

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MCE MBMS M2AP ID | M | | 9.2.3.1 | | YES | ignore |
| eNB MBMS M2AP ID | M | | 9.2.3.2 | | YES | ignore |
| Neighboring eNB CGI(s) | O | | 9.x.y.z | | YES | ignore |
| Criticality Diagnostics | O | | 9.2.1.7 | | YES | ignore |

Figure 12

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| Handover Type | M | | 9.2.1.13 | | YES | reject |
| Cause | M | | 9.2.1.3 | | YES | ignore |
| Target ID | M | | 9.2.1.6 | | YES | reject |
| Direct Forwarding Path Availability | O | | 9.2.3.15 | | YES | ignore |
| SRVCC HO Indication | O | | 9.2.1.59 | | YES | reject |
| Source to Target Transparent Container | M | | 9.2.1.56 | | YES | reject |
| Source to Target Transparent Container Secondary | O | | Source to Target Transparent Container 9.2.1.56 | | YES | reject |
| MS Classmark 2 | C-ifSRVCCto GERAN | | 9.2.1.64 | | YES | reject |
| MS Classmark 3 | C-ifSRVCCto GERAN | | 9.2.1.65 | | YES | ignore |
| CSG Id | O | | 9.2.1.62 | | YES | reject |
| Cell Access Mode | O | | 9.2.1.74 | | YES | reject |
| PS Service Not Available | O | | 9.2.1.77 | | YES | ignore |
| p-t-m to p-t-p switch | O | 1 | | | YES | reject |
| >IP Multicast Address | O | | IP Address 9.2.2.1 | | - | |
| >IP Source Address | O | | IP Address 9.2.2.1 | | - | |
| Qualified cell(s) | O | | | | YES | reject |
| >CGI | O | | 9.x.x.x | | | |
| >related TMGI(s) | O | | 9.y.y.y | | | |

Figure 13

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| Handover Type | M | | 9.2.1.13 | | YES | reject |
| Cause | M | | 9.2.1.3 | | YES | ignore |
| UE Aggregate Maximum Bit Rate | M | | 9.2.1.20 | | YES | reject |
| E-RABs To Be Setup List | | 1 | | | YES | reject |
| >E-RABs To Be Setup Item IEs | | 1 to <maxnoof E-RABs> | | | EACH | reject |
| >>E-RAB ID | M | | 9.2.1.2 | | - | |
| >>Transport Layer Address | M | | 9.2.2.1 | | - | |
| >>GTP-TEID | M | | 9.2.2.2 | To deliver UL PDUs | - | |
| >>E-RAB Level QoS Parameters | M | | 9.2.1.15 | Includes necessary QoS parameters | - | |
| >>Data Forwarding Not Possible | O | | 9.2.1.76 | | YES | ignore |
| Source to Target Transparent Container | M | | 9.2.1.56 | | YES | reject |
| UE Security Capabilities | M | | 9.2.1.40 | | YES | reject |
| Handover Restriction List | O | | 9.2.1.22 | | YES | ignore |
| Trace Activation | O | | 9.2.1.4 | | YES | ignore |
| Request Type | O | | 9.2.1.34 | | YES | ignore |
| SRVCC Operation Possible | O | | 9.2.1.58 | | YES | ignore |
| Security Context | M | | 9.2.1.26 | | YES | reject |
| NAS Security Parameters to E-UTRAN | C-iffromUTRANGERAN | | 9.2.3.31 | The eNB shall use this IE as specified in [15]. | YES | reject |
| CSG Id | O | | 9.2.1.62 | | YES | reject |
| CSG Membership Status | O | | 9.2.1.73 | | YES | ignore |
| GUMMEI | O | | 9.2.3.9 | This IE indicates the MME serving the UE | YES | reject |
| MME UE S1AP ID 2 | O | | 9.2.3.3 | This IE indicates the MME UE S1AP ID assigned by the MME | YES | reject |
| p-t-m to p-t-p switch | | 1 | | | YES | reject |
| >IP Multicast Address | M | | IP Address 9.2.2.1 | | - | |
| >IP Source Address | M | | IP Address 9.2.2.1 | | - | |
| Qualified cell(s) | O | | | | YES | reject |
| >CGI | O | | 9.x.x.x | | | |
| >related TMGI(s) | O | | 9.y.y.y | | | |

EFFICIENT MULTIMEDIA BROADCAST MULTICAST SERVICE CONTINUITY METHODS

BACKGROUND

As used herein, the terms "user equipment" or "UE" might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, a relay, a remote radio head, or a similar component rather than a traditional base station. Any such component may be referred to herein as an eNB, but it should be understood that such a component is not necessarily an eNB. Such a component may also be referred to herein as an access node. Also, the terms "eNB" and "cell" might be used interchangeably herein.

Services that might be provided by LTE-based equipment can include broadcasts or multicasts of television programs, streaming video, streaming audio, and other multimedia content. Such services are commonly referred to as multimedia broadcast multicast services (MBMS). An MBMS might be transmitted throughout a single cell or throughout several contiguous or overlapping cells in the same or different carriers. When multiple cells overlap, a UE within the overlapped region can receive transmissions from multiple eNBs. When a UE receives substantially identical data from a plurality of eNBs, the transmissions from the eNBs can augment one another to provide a signal of significantly higher quality than would be the case if only one eNB were transmitting the signal. That is, a higher signal-to-interference-plus-noise ratio can be achieved when substantially the same data is transmitted at substantially the same time on substantially the same resource with substantially the same modulation and coding. A set of cells in which a plurality of substantially identical signals are present is known as a single frequency network, or SFN. If an MBMS is being transmitted with substantially identical signals in a set of cells, the set of cells can be referred to as a multicast/broadcast SFN (MBSFN).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is an illustration of a table of cells and MBSFNs associated with the cells, according to an embodiment of the disclosure.

FIG. 7 illustrates wording that might be included in 3GPP TS 36.331, according to an embodiment of the disclosure.

FIG. 8 illustrates wording that might be included in 3GPP TS 36.331, according to another embodiment of the disclosure.

FIG. 9 illustrates wording that might be included in 3GPP TS 36.331, according to another embodiment of the disclosure.

FIG. 11 illustrates information that might be included in an MBMS query message, according to an embodiment of the disclosure.

FIG. 12 illustrates information that might be included in an MBMS query response message, according to an embodiment of the disclosure.

FIG. 13 illustrates information that might be included in a Handover Required message, according to an embodiment of the disclosure.

FIG. 14 illustrates information that might be included in a Handover Request message, according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
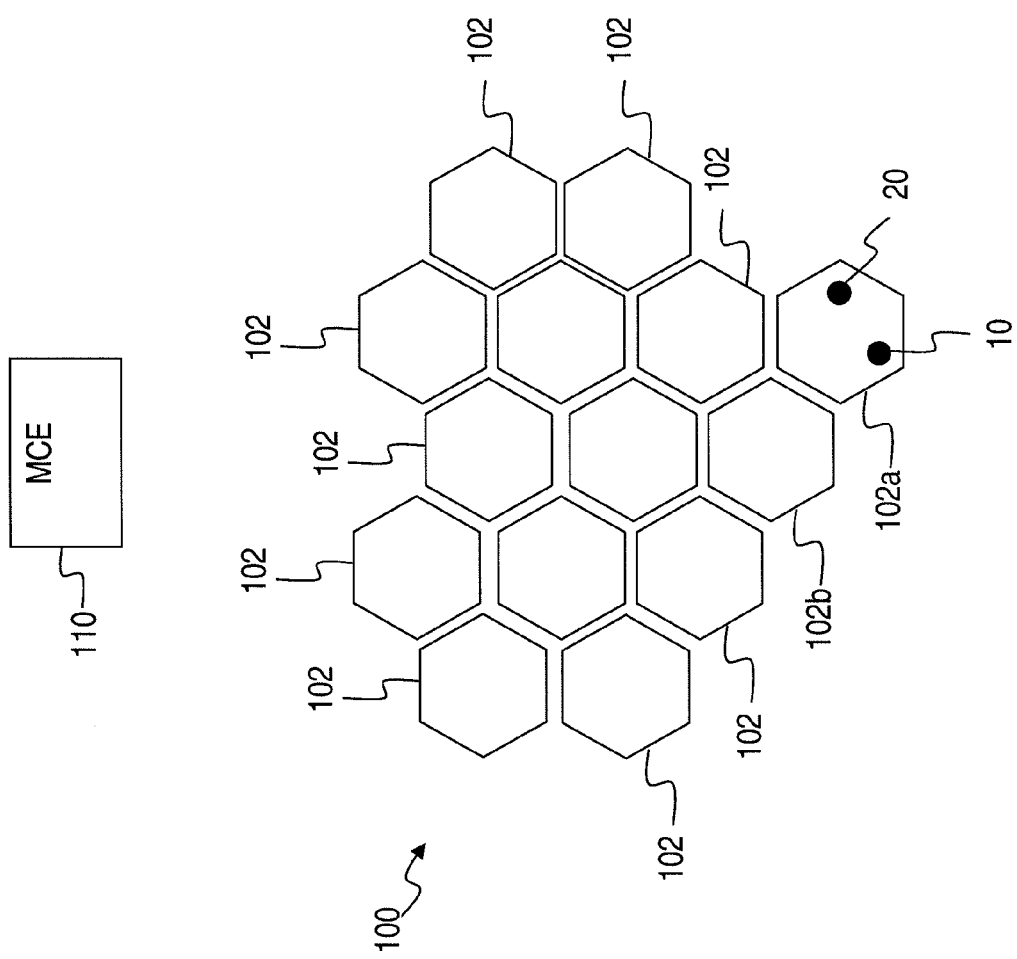
FIG. 1 is an illustration of a cellular network, according to an embodiment of the disclosure.

FIG. 1 illustrates an exemplary network 100 according to an embodiment of the disclosure. The network 100 may include a plurality of cells 102. Each of the cells 102 represents a coverage area for providing wireless telecommunication services of the network 100 via an access node. In some cases, the cells 102 might be referred to by other names, such as "hotspots". While the cells 102 are depicted as having non-overlapping coverage areas, one or more of the cells 102 may have partially overlapping coverage with adjacent cells.

Further, while a particular number of the cells 102 are depicted, a larger or smaller number of the cells 102 may be included in the network 100.

One or more UEs 10 may be present in each of the cells 102. Although only one UE 10 is depicted and is shown only in cell 102$_a$, a plurality of UEs 10 might be present in each of the cells 102. An eNB 20 in each of the cells 102 provides a radio link between the UEs 10 and other components in a telecommunications network. While the eNB 20 is shown only in cell 102$_a$, it should be understood that an eNB would be present in each of the cells 102. Also, access nodes other than the eNBs 20 could be used. The eNBs 20 can communicate with an MBMS control entity (MCE) 110 or a similar network component that can provide centralized or distributed management and coordination among the eNBs 20.

Embodiments of the present disclosure enable MBMS service continuity for UEs 10 in the network 100. That is, UEs 10 that are receiving an MBMS transmission can continue receiving the MBMS transmission after moving to another cell. For example, the UE 10 in cell 102a might be receiving an MBMS transmission from the eNB 20 in that cell. If the UE 10 then moves to another cell, cell 102b for instance, the UE 10 can continue the MBMS reception that the UE 10 was receiving or was interested in receiving in cell 102a.

MBMS is a point to multipoint (p-t-m) service that allows data from a single source entity to be transmitted to multiple endpoints, using efficient radio resources. The data typically originates from a Broadcast Multicast Service Center (BM-SC) and is sent to one or more eNBs. The eNBs then transmit the data over the air interface to one or more UEs. The UEs receive the content of the service substantially simultaneously using radio resources comparable to a unicast transmission to one user. In most cases, the MBMS transmission may be unidirectional, but in some cases, the MBMS transmission could be bi-directional. That is, in most cases, the UEs do not have an uplink radio bearer to transmit an acknowledgement/negative acknowledgement (ACK/NACK), to report channel quality, or to send other information on an uplink.

An LTE UE knows about the available MBMS services from information the UE receives in System Information Block type 13 (SIB13) in the broadcast channel (BCCH). SIB13 contains information to acquire the MBMS Control Channel (MCCH). Upon acquiring the MCCH, the UE obtains information about the available MBMS services and about how to obtain the services.

A UE can acquire the MCCH in the radio resource control (RRC) Idle state or in the RRC Connected state. In Universal Mobile Telecommunications Service (UMTS), when a UE finds an MBMS service of interest, the UE can register to join a multicast service or can join a broadcast service without registering. A broadcast service typically requires no subscription, and a multicast service typically requires a subscription. Through join and leave procedures, the BM-SC typically knows how many users are registering for a multicast service, and may activate and deactivate the service based on the number of users joining and leaving the service. The BM-SC cannot keep track of the number of broadcast users. It should be noted, however, that joining an MBMS service is not necessarily an indication that a UE is receiving the MBMS multicast transmission. Moreover, in LTE, MBMS does not have join and leave procedures. As used herein, the term "MBMS service" or simply "MBMS" might refer to a multimedia broadcast or multicast that may be available in a cell but that may or may not be received by a UE in that cell.

The term "MBMS session" might refer to a particular instance of an MBMS service that is actually being received by a UE.

The concept of MBSFN (Multicast Broadcast Single Frequency Network) was introduced to expand MBMS service to a plurality of cells. Such cells synchronously transmit MBMS traffic using the same radio properties, and when the cells are adjacent to each other, a UE can combine the radio signals from neighboring cells and obtain a better SINR (Signal to Interference plus Noise Ratio). So the lack of an ACK/NACK and other issues mentioned above with regard to the unidirectional transmission mode for MBMS services are somewhat compensated for by the fact that the UE can combine radio signals from adjacent cells and thereby possibly receive fewer error frames. In addition, a procedure for counting users in the RRC connected state can help the BM-SC determine how many users in the MBSFN are interested in receiving or are already receiving an MBMS service. The results of the counting procedure can be used by the BM-SC to determine the activation, deactivation, and reactivation status of an MBMS service that is being provided to all the cells in an MBSFN, rather than this information being provided on a per-cell basis. This counting procedure does not include UEs in the RRC Idle state.

As mentioned above, LTE does not have joining and leaving procedures similar to those in UMTS. This means an eNB has no information about the MBMS services that a UE is actively receiving or is interested in receiving. When a UE is to be handed over from a source cell to a target cell, the eNB determines which cell will be the target cell based on signal measurement reports from the UE. However, since the eNB has no information about the MBMS services that the UE is receiving or is interested in receiving, the eNB cannot adjust the handover decision to ensure that the UE will be handed over to a target cell where the MBMS services will continue to be available. That is, the eNB hands the UE over to the cell with the best signal quality, without regard to the MBMS services available in that cell. If an MBMS service that the UE is receiving in the source cell is available in the target cell, the MBMS service might be continued in the target cell. However, if an MBMS service that the UE is receiving in the source cell is not available in the target cell, the MBMS service might be dropped when the UE moves to the target cell.

Embodiments of the present disclosure enable a network to direct a UE that is receiving an MBMS service to a target cell where the UE can continue receiving the same MBMS service. The handover decision is not based on a signal strength measurement alone, but is adjusted to ensure that the UE will be handed over to a target cell where the MBMS service will continue to be available. The embodiments provide such service continuity for UEs in the RRC Connected mode. While the following discussion focuses on LTE, it should be understood that the embodiments are also valid for UMTS and other technologies.

Such service continuity is achieved through the use of the temporary multicast group identities (TMGIs) associated with MBMS services. A TMGI can be considered a unique identifier for an MBMS service.

In an embodiment, at least one TMGI associated with at least one MBMS service that a UE is currently receiving or is interested in receiving is added to a message from the UE to the eNB. In some embodiments, the message is a measurement report. The presence of a TMGI in the message indicates to the eNB that the UE is receiving or is interested in receiving the associated MBMS service. If the eNB does not have information about the MBMS service associated with the TMGI, the eNB can query the MCE, a mobility management entity (MME), or a similar network component for such information. That is, the eNB can provide the TMGI to the MCE or MME, and the MCE or MME can then inform the eNB which neighboring cells can provide the MBMS service associated with that TMGI. The eNB can then hand the UE over to a cell that can provide the MBMS service and that has adequate signal quality. One of skill in the art will recognize that certain functions described herein as being performed by the MCE might actually be performed by the MME or vice versa. Therefore, hereinafter, the terms "MCE", "MME", and "network component" might be used interchangeably.

In an alternative embodiment, rather than querying a network component, a source eNB might query an eNB in a neighboring cell to determine if the eNB in the neighboring cell can provide an MBMS service that the source eNB is providing or has been asked to provide. Hereinafter, an eNB in a neighboring cell might be referred to as a neighboring eNB. As described in more detail below, eNBs might be able to store information obtained from a query to a network component regarding associations between TMGIs and MBMS services. If a source eNB has such stored information, the source eNB might be able to send a query directly to a neighboring eNB to determine the MBMS services the neighboring eNB can provide. If the neighboring eNB also has such stored information, the source eNB and the neighboring eNB can exchange information from their respective information stores to determine if the neighboring eNB is capable of providing the MBMS service that the source eNB is providing or has been asked to provide. If the neighboring eNB can provide the MBMS service, the source eNB might hand a UE over to the neighboring eNB if the signal quality in the neighboring cell is adequate. Alternatively, the source eNB and the neighboring eNB might have the capability to associate TMGIs with MBMS services and might thus be capable of determining, without a query to a network component, whether such a handover is possible. In either case, communication between the source eNB and the neighboring eNB may occur over the X2 interface.

The cell to which a UE is handed over in such cases is not necessarily the cell to which the UE would be handed over if the UE were not receiving an MBMS service. That is, if the UE is not receiving an MBMS service, the UE is typically handed over to the neighboring cell with the best SINR. If the UE is receiving an MBMS service but the neighboring cell with the best SINR is not providing the MBMS service that the UE is receiving, the UE will not be handed over to that cell. In such a case, the UE might be handed over to the cell that has the best SINR among the cells that can provide the MBMS service.

In an embodiment, a signal quality threshold is set to determine whether MBMS service continuity can be provided by handing a UE over to a particular cell. That is, if one or more cells near a UE's current cell are capable of providing an MBMS service that the UE is currently receiving, but none of those cells have a signal quality that exceeds the threshold, then the UE would not be handed over to one of those cells. Instead, the UE might be handed over to a cell that has the best signal quality but does not provide the MBMS service, and the MBMS service might be dropped. Hereinafter, any cell with a signal quality that exceeds this signal quality threshold for allowing MBMS service continuity will be referred to as a measured cell.

In other embodiments, other procedures might be used for prioritizing among MBMS-based transmissions and traditional unicast transmissions. For example, if the UE has a mix of unicast and MBMS services, or if the neighbor cells are not part of the MBSFN, the regular threshold for the unicast transmission might be used. If the unicast is an emergency call, the serving eNB might ignore the TMGI and select the target eNB based on the signal strength only. If the MBMS service contains an emergency service announcement (ESA), the serving eNB might select a target eNB that can provide MBMS service continuation, and the selected target cell may not necessarily have the best SINR.

Alternatively, the UE may send a new MBMS priority information element (IE) in the measurement report to indicate the priority of any MBMS services the UE is using. The target cell selection may be influenced by the priority to provide MBMS service continuity through p-t-m transmission. That is, the selected target cell may not be the cell with the best SINR, if the cell with the best SINR does not belong to the MBSFN. If the MBMS priority IE does not indicate that MBMS services should be prioritized, the target might be selected based on the best SINR, and the MBMS services may be continued through (point-to-point) p-t-p transmission.

The UE might send a TMGI with every measurement report the UE sends to the eNB. After receiving the TMGI, the eNB might perform the procedures described above to determine the cells near the UE that can provide the MBMS service associated with the TGMI. However, it may be wasteful for the eNB to query the MCE or a neighboring eNB for TMGI-related information each time the eNB receives a measurement report, since the requested information may not change often. In an embodiment, the eNB can store such information for future use. That is, after receiving information from the MCE regarding which cells are providing which MBMS services, the eNB can retain that information for a pre-specified period of time. If a handover procedure is initiated within that period of time, the eNB can consult the stored information to determine the cells to which a UE can be handed over in order for the UE to continue receiving an MBMS service. After the time period expires, the eNB might again query the MCE or a neighboring eNB to obtain information relating TMGIs to cells that can provide the MBMS services associated with those TMGIs.

Hereinafter, a target cell capable of providing an MBMS service desired by a UE will be referred to as a qualified cell. A qualified cell that an eNB becomes aware of through a query to the MCE or to a neighboring eNB will be referred to as a returned qualified cell. A qualified cell that an eNB becomes aware of through retrieval from storage will be referred to as a stored qualified cell.

The eNB can compare the measured cells that exceed the threshold for signal quality with the stored cells capable of providing a particular MBMS service. If none of the measured cells matches the stored cells, the eNB can send an M2 interface Application Protocol (M2AP) message to the MCE, an M2AP/M3AP (M3 interface Application Protocol) new MBMS Query message to the MME, or an X2 interface Application Protocol (X2AP) message to a neighboring eNB. Any such message can include the TMGI associated with the MBMS service. The MCE or the MME can then respond with a list of cells in the proximity of the inquiring eNB that, based on the TMGI, are known to be providing an MBMS service that the UE is receiving or is interested in receiving. Alternatively, the neighboring eNB can indicate whether it supports the MBMS service, based on the received TMGI, that the UE is receiving or is interested in receiving.

During an MBMS session start, the MME can send an MBMS session start request to the MCE that includes the relevant TMGI. This request might be followed by an MBMS session start request from the MCE to the corresponding eNBs. In this way, the MCE and the MME (through the MCE)

can have a map of which MBMS services are available in each eNB. Upon receiving a new MBMS Query message, the MCE or MME can query a table that contains the cells that are in the proximity of the inquiring eNB and that are providing the queried MBMS service. The MCE can respond with an M2AP message or the MME can respond with an M2AP/M3AP new MBMS Query ACK message containing the qualified cells. Alternatively, an eNB can send an X2 MBMS Query message directly to a neighboring eNB and the neighboring eNB can respond with an X2 MBMS Query ACK to indicate whether the neighboring eNB supports the MBMS service corresponding with the TMGI received. If the neighboring eNB supports the MBMS service, the neighboring eNB is considered a qualified cell.

FIG. 2 illustrates an example of such a table that might be stored in the MCE or the MME. In an example, a query might contain MBSFN1/TMGI1 and MBSFN3/TMGI3, as shown in column 210. That is, a UE might request that the MBMS services associated with TMGI1 and TMGI3 be available in the cell to which the UE is being handed over. Column 220 indicates that Cell1 is part of MBSFN1 and MBSFN2. Column 230 indicates that Cell2 is part of MBSFN1, MBSFN2, MBSFN3, and MBSFN4. Column 240 indicates that Cell3 is part of MBSFN2 and MBSFN4. Column 250 indicates that Cell4 is part of MBSFN1, MBSFN3, and MBSFN4. In other words, the table indicates that Cell1, Cell2 and Cell4 at the proximity of the inquiring eNB are part of MBSFN1 and that Cell2 and Cell4 at the proximity of the inquiring eNB are part of MBSFN3. (In current specifications, a cell is limited to have only one MBSFN, but an MBSFN may carry one or more MBMS sessions through one or more TMGIs). In this case, the MCE or MME will return Cell2 and Cell4 as qualified cells in an MBMS Query ACK message, since both cells are members of the MBSFNs in the query. Alternatively, the MCE or MME may return Cell1, Cell 2 and Cell4 that belong to MBSFN1/TMGI1 and may return Cell2 and Cell4 that belong to MBSFN3/TMGI3 and may let the eNB match the cells with the MBSFNs based on the TMGI received from the UE. The eNB sends the available MBMS service to the UE so that the UE can continue or initiate MBMS service in the target cell by including the corresponding TMGI in the RRC Connection Reconfiguration message.

There is a possibility that none of the qualified cells returned in the MBMS Query ACK matches the measured cells or that no neighboring eNB indicates support of the MBMS service corresponding to the TMGI. In such cases, the serving eNB may decide to add p-t-p transmission for MBMS services in the serving cell so that the UE can combine the p-t-p and the p-t-m transmissions for improved MBMS service reception. Alternatively, the serving eNB may decide to hand over the UE to a target cell solely based on the measurement result and change the p-t-m transmission to a p-t-p transmission for the MBMS services to the UE in the target cell. In this case, the RRC Connection Reconfiguration will not include the TMGI.

Two different scenarios will now be considered in more detail. In the first scenario, at least one returned qualified cell and/or at least one stored qualified cell matches at least one measured cell, or at least one neighboring cell supports an MBMS service that a UE in another cell is receiving or is interested in receiving. In the second scenario, neither a returned qualified cell nor a stored qualified cell matches a measured cell and no neighboring cell supports an MBMS service that a UE in another cell is receiving or is interested in receiving.

If a returned qualified cell eNB or a stored qualified cell matches a measured cell, the source cell can select the best qualified cell as the target cell based on the signal strength. That is, returning to FIG. 2, the source cell selects either cell2 or cell4 as the target cell, depending on which of those two cells has the better signal quality. The UE can continue receiving an MBMS service in the selected target cell. Since the target cell is part of the MBSFN, the MBMS service is multicast in the target cell with the same radio properties as in the source cell.

The source cell directs the handover by sending an RRC Connection Reconfiguration message to the UE with the TMGI and the selected target cell, so the UE knows that the target cell is capable of providing the MBMS service that the UE is receiving or is interested in receiving. If the UE also has a unicast session, the unicast session is also handed over to the same target cell, and the unicast handover procedures are not impacted.

The source cell can update the stored qualified cells with the returned qualified cells and then forward that information to the target cell, e.g., through X2AP or S1AP, to update the stored qualified cells in the target cell. In a subsequent handover, if a measured cell that has sufficient quality to support MBMS multicast service matches one or more of the up-to-date stored qualified cells, the source cell need not send an MBMS query to the MCE, the MME, or a neighboring cell and can select the next target cell from among the up-to-date stored qualified cells. The forwarding of the query result to the target cell can eliminate the need for a query from the target cell to the MCE, the MME, or a neighboring cell in the case of a handover from the target cell to a neighboring cell.

In an embodiment, if there is a discrepancy between a stored qualified cell and a returned qualified cell, the returned qualified cell takes precedence and the stored qualified cell is updated.

In an embodiment, the storing duration of the qualified cells with their corresponding TMGIs in an eNB is timer based. Alternatively, the storing can be terminated when the eNB deactivates its membership in the MBSFN. Alternatively, the storing can be terminated when the MBMS duration, set during session start, expires. For example, after a certain period of not receiving a measurement report containing a TMGI, an eNB may remove the list of cells associated with that TMGI. As an example, an eNB might maintain a validation timer for each TMGI entry. When an update is received for a particular TMGI entry, the corresponding timer might be restarted. If the timer for a TMGI entry expires, the TMGI entry will be cleared.

If a plurality of MBMS services are available in a cell and an eNB receives up-to-date information for some but not all of the MBMS services, only the timers corresponding to the received information are restarted, while the other timers expire. In addition, if a TMGI entry has not been updated via the MCE, the MME, or a neighboring cell for a certain period of time, the eNB may still choose to request the qualified cells from the MCE, the MME, or a neighboring cell even though the corresponding validation timer is not yet expired.

In the scenario where neither a returned qualified cell nor a stored qualified cell matches a measured cell and none of the neighboring cells supports the MBMS service that the UE is receiving or is interested in receiving, the source cell can add p-t-p transmission for the reporting UE (or the source cell could trigger the UE to establish the p-t-p transmission in this case), and may simultaneously transmit the same MBMS service with p-t-m transmission. The source cell can add p-t-p transmission with more robust radio properties by sending an RRC Connection Reconfiguration message to the UE with a nonHO indication. The procedure may trigger higher layer procedures where the UE may activate a dedicated enhanced packet switch (EPS) bearer for the p-t-p transmission, assuming the UE has established the default EPS bearer during the RRC Connection procedure. The p-t-p transmission allows a robust hybrid automatic repeat request (HARQ) scheme even when the radio link controller (RLC) mode is unacknowledged mode (UM), similar to the p-t-m transmission.

The simultaneous p-t-m and p-t-p transmission of the same MBMS service can require the cell to put the same RLC protocol data unit (PDU) on different schedules, in the MBMS channel (MCH) and in the downlink shared channel (DL-SCH), with different radio properties. For example, a p-t-p transmission may have a less aggressive modulation and coding scheme.

The simultaneous p-t-p and p-t-m reception with the same MBMS content allows the UE to combine the p-t-m and p-t-p communications in the RLC layer to improve the p-t-m communication received by the UE. In addition, the p-t-p transmission gives time to prepare the p-t-p handover to the adjacent cell that is not part of the MBSFN so the UE can continue the MBMS service in the target cell through p-t-p transmission.

The S1AP (S1 interface Application Protocol) Handover Required and Handover Request messages or X2AP (X2 interface Application Protocol) Handover Request message can include an MBMS indication with the IP multicast address of the MBMS gateway (MBMS-GW) so that the target cell can join the MBMS multicast from the MBMS-GW. An alternative is for the source cell to directly hand over the MBMS service from p-t-m transmission in the source cell to p-t-p transmission in the target cell. Similarly, the S1AP Handover Required and Handover Request messages or X2AP Handover Request message can include an MBMS indication with the IP multicast address of the MBMS-GW so that the target cell can join the MBMS multicast from the MBMS-GW. The source cell directs the handover by sending an RRC Connection Reconfiguration message to the UE with a non-MBMS indication (e.g., MBMS indication set to '0') and to the target cell, so the UE will not retain the MBMS properties when it is joining the target cell but establishes the p-t-p or unicast radio properties. If the UE also has a unicast session, the other unicast handover procedures are not impacted.

Figure 3:
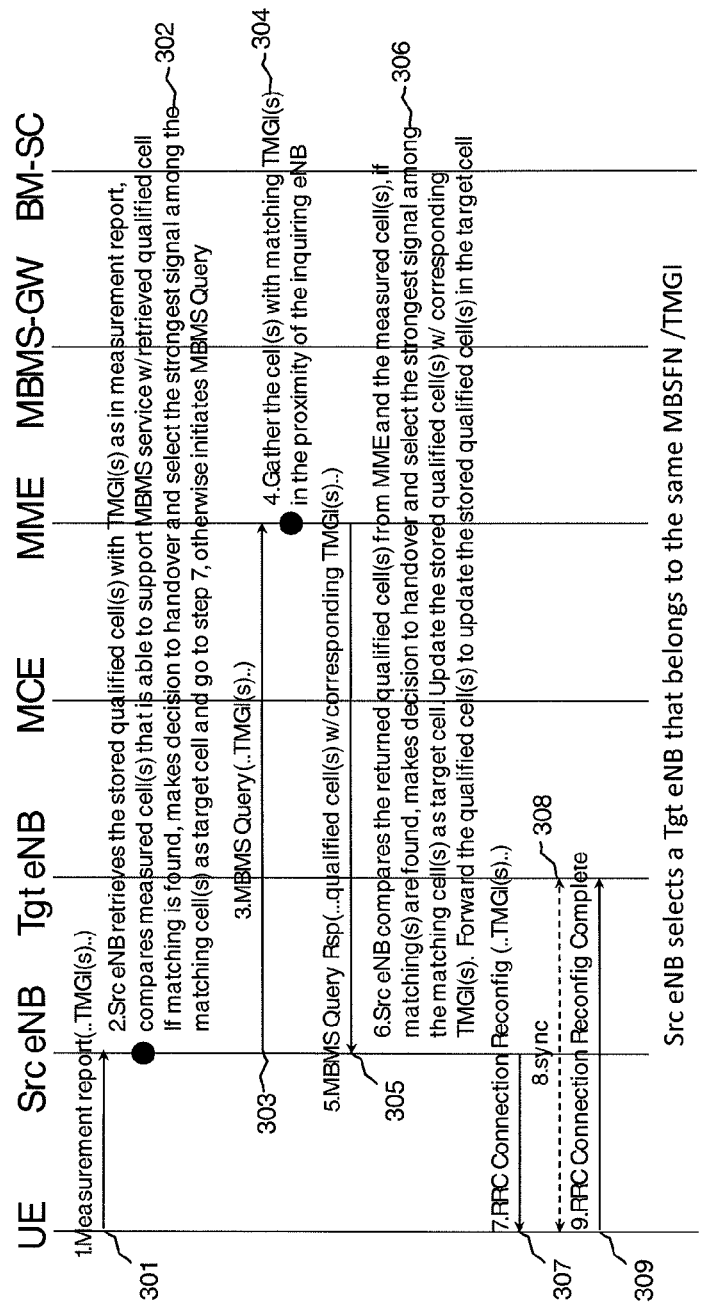
FIG. 3 is a call flow diagram for a case where a qualified cell matches a measured cell, according to an embodiment of the disclosure.

FIG. 3 illustrates an embodiment of a call flow for the case where at least one returned qualified cell or at least one stored qualified cell matches at least one measured cell. At event 301, if the signal strength of a neighboring cell exceeds a certain threshold or other conditions are met, the UE sends a measurement report to the source eNB or source cell. If the UE is receiving or is interested in receiving an MBMS service, the included TMGI indicates the MBMS service that the UE is receiving or is interested in receiving. Otherwise, the TMGI is set to '0' or may be absent.

At event 302, the source eNB retrieves the stored cells that are transmitting the same TMGIs as in the measurement report (i.e., the stored qualified cells). If there is a match between a stored qualified cell and a measured cell, select a cell with the strongest signal among the matching cells as the target cell and go to event 307. Otherwise, initiate an MBMS query at event 303.

At event 303, the source eNB sends an M2AP/M3AP MBMS Query to the MME (via the MCE), with a TMGI similar to the TMGI in the measurement report. At event 304, the MME retrieves the cells in the proximity of the inquiring eNB that are transmitting the same TMGI. At event 305, the MME returns the qualified cells with the corresponding TMGIs in an MBMS Query Response message to the source eNB.

At event 306, the source eNB matches the returned qualified cells from the MME to the measured cell. If a matching cell is found, select a cell with the strongest signal among the matching cells as the target cell. Update the stored qualified cells with the returned qualified cells from the MME when applicable. Also, forward the qualified cells from the MME to the target cell via S1AP or X2AP to update the stored qualified cells in the target cell.

At event 307, the source eNB sends an RRC Connection Reconfiguration message to the UE to start the handover procedure including the TMGI. This TMGI indicates an MBMS service that the UE can continue to receive through p-t-m transmission in the target cell, since it is possible that some of the MBMS services that the UE is receiving or is interested in receiving are not available through p-t-m transmission. It is up to UE to initiate p-t-p transmission for the MBMS services that are not available through p-t-m transmission.

At event 308, the UE synchronizes with the target cell. At event 309, the UE sends an RRC Connection Reconfiguration Complete message to the target cell.

Figure 4:
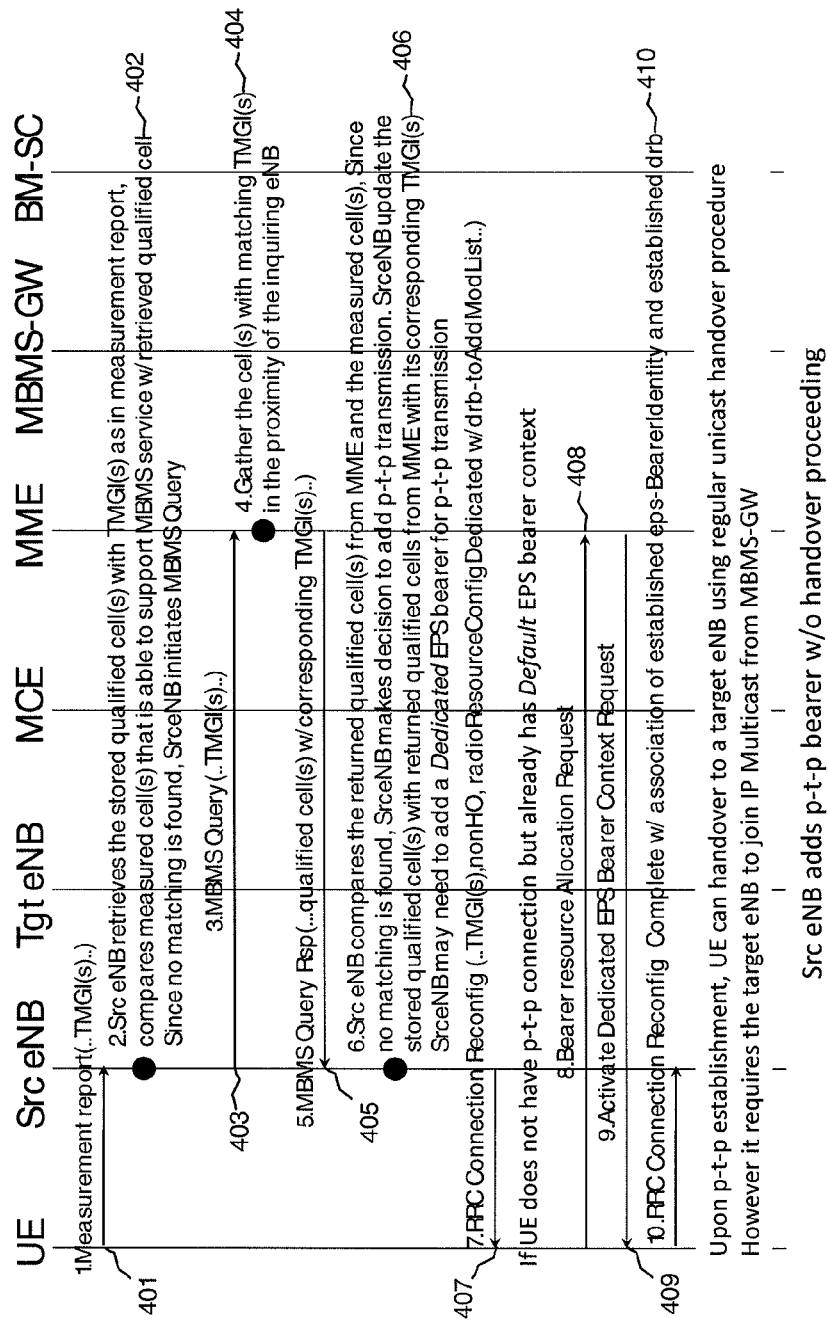
FIG. 4 is a call flow diagram for a case where a qualified cell does not match a measured cell, according to an embodiment of the disclosure.

FIG. 4 illustrates an embodiment of a call flow for the case where neither a returned qualified cell nor a stored qualified cell matches a measured cell. In this case, a p-t-p transmission is added in the source cell to improve reception at the source cell. At event 401, if the signal strength of a neighboring cell exceeds a certain threshold or other conditions are met, the UE sends a measurement report to the source eNB or source cell. If the UE is receiving or is interested in receiving an MBMS service, the included TMGI indicates the MBMS service that the UE is receiving or is interested in receiving. Otherwise, the TMGI is set to '0' or may be absent.

At event 402, the source eNB attempts to retrieve the stored cells transmitting the same TMGIs as in the measurement report (i.e., the qualified cells). There is no match between the qualified cells and the measured cell, triggering the source eNB to initiate an MBMS query at event 403. At event 403, the source eNB sends an M2AP/M3AP MBMS Query to the MME (via the MCE), with a TMGI similar to the TMGI in the measurement report. At event 404, the MME retrieves the cells in the proximity of the inquiring eNB with the same TMGIs. At event 405, the MME returns the qualified cells with the corresponding TMGIs in an MBMS Query Response message to the source eNB.

At event 406, the source eNB attempts to match the qualified cells from the MME to the measured cell. Since a matching cell is not found, the source eNB may initiate concurrent unicast transmissions to deliver the MBMS services. The source eNB still updates the stored qualified cells with the qualified cells from the MME when applicable, but will not forward the qualified cells from the MME to the target cell, since in this step the source eNB may not initiate a handover to a target cell.

At event 407, the source eNB sends an RRC Connection Reconfiguration message to the UE with a nonHO indicator to add a unicast transmission in the source cell. The source eNB includes a TMGI, so the UE knows that the additional unicast transmission in the source cell is dedicated for an MBMS service. The UE combines the MBMS p-t-m and p-t-p transmissions in the RLC layer. If there is more than one MBSFN overlap in a cell and if the UE can receive MBMS services from more than one MBSFN, the UE can add a unicast for a TMGI within one MBSFN and keep receiving a multicast transmission from a TMGI within the other MBSFNs.

At event 408, assuming that the UE has already established the default EPS bearer, the unicast transmission may require a new dedicated EPS bearer to be established. The UE sends a Bearer Resource Allocation request to the MME. At event 409, the MME returns an Activate Dedicated EPS Bearer Context Request. At event 410, the UE sends an RRC Connection Reconfiguration Complete message to the source eNB to indicate that the unicast bearer has been established and that MBMS through p-t-p transmission can start. If the p-t-m transmission becomes worse, the UE may stop receiving the MBMS p-t-m transmission. The unicast transmission can then hand over to a better cell as a regular p-t-p transmission handover.

Figure 5:
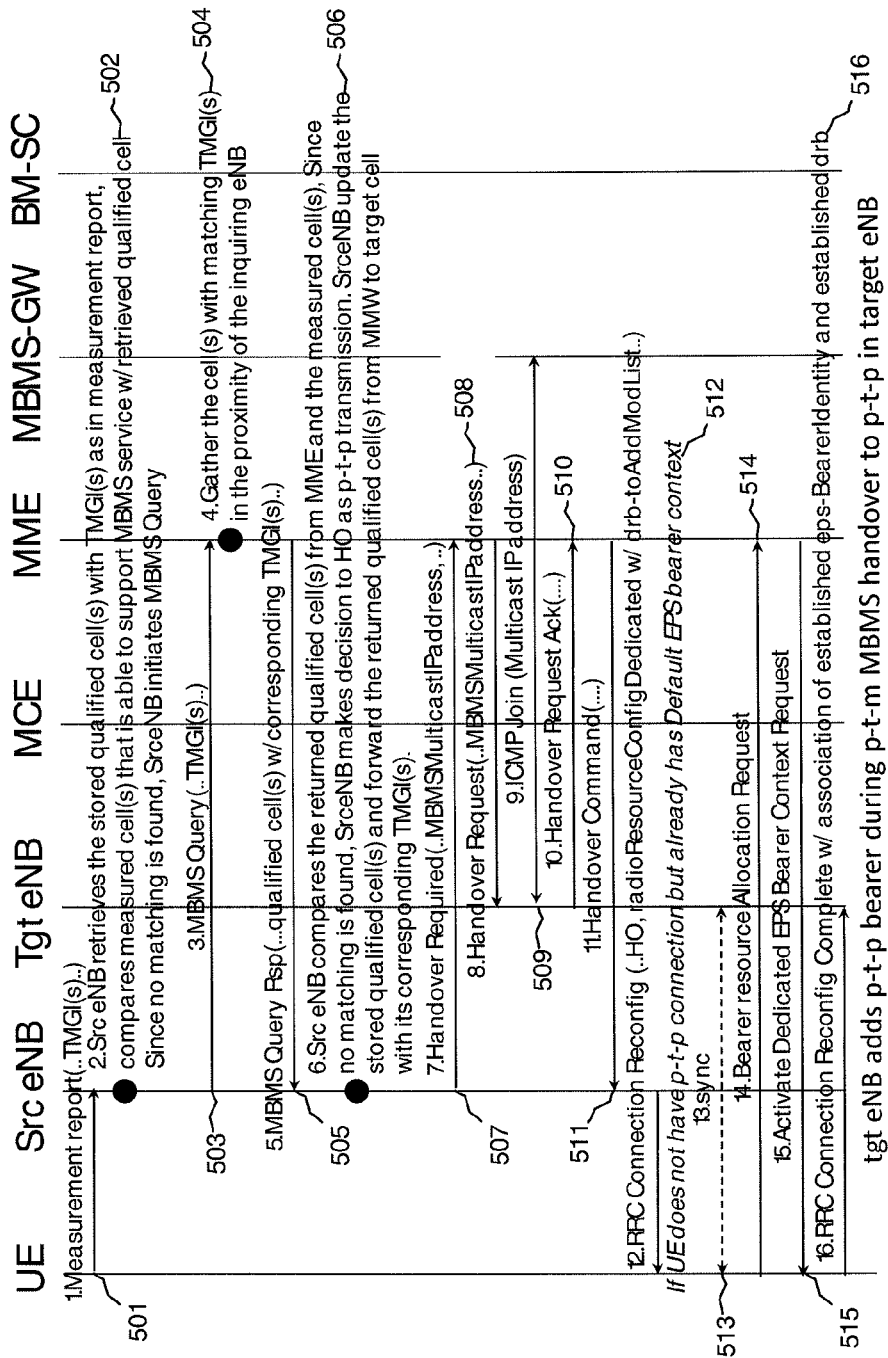
FIG. 5 is a call flow diagram for a case where a qualified cell does not match a measured cell, according to another embodiment of the disclosure.

FIG. 5 illustrates an embodiment of a call flow for the case where neither a returned qualified cell nor a stored qualified cell matches a measured cell. In this case, a p-t-p transmission is added in the target cell to hand over to the target cell. At event 501, if the signal strength of a neighboring cell exceeds a certain threshold or other conditions are met, the UE sends a measurement report to the source eNB or source cell. If the UE is receiving or is interested in receiving an MBMS service, the included TMGI indicates the MBMS service that the UE is receiving or is interested in receiving. Otherwise, the TMGI is set to '0' or may be absent.

At event 502, the source eNB attempts to retrieve the stored cells transmitting the same TMGI as in the measurement report (i.e., the qualified cells). There is no match between the qualified cells and the measured cell, triggering the source eNB to initiate an MBMS query in at event 503. At event 503, the source eNB sends an M2AP/M3AP MBMS Query to the MME (via the MCE) with a TMGI similar to the TMGI in the measurement report. At event 504, the MME retrieves the cells in the proximity of the inquiring eNB with the same TMGI. At event 505, the MME returns the qualified cells with the corresponding TMGIs in an MBMS Query Response message to the source eNB.

At event 506, the source eNB attempts to match the qualified cells from the MME to the measured cell. Since a matching cell is not found, the source eNB may initiate a unicast handover to the cell with the strongest signal strength to deliver the MBMS service. The source eNB updates the stored qualified cells with the qualified cells from the MME when applicable, and forwards the qualified cells from MME to the target cells.

At event 507, the S1AP Handover Required message includes the MBMS IP multicast address. Alternatively, the S1AP Handover Required message includes the TMGI, and the MME will find the IP multicast address of the MBMS session that the UE is joining.

At event 508, the S1AP Handover Request message includes the MBMS IP multicast address for the target eNB to join. At event 509, the target eNB joins the IP multicast address and starts receiving the MBMS traffic for that particular session. At event 510, the target eNB returns a Handover Request ACK to the MME with the p-t-p radio resource dedicated for the UE when the UE hands off to the target cell. At event 511, the MME sends an S1AP Handover Command to the source eNB.

At event 512, the source eNB sends an RRC Connection Reconfiguration message to the UE to start the handover procedure, including the TMGI and additional dedicated bearer information in the target cell, so the UE knows that in the target cell the UE will receive the corresponding MBMS service through p-t-p transmission. If more than one MBSFN overlaps in a cell and if the UE can receive MBMS services from more than one MBSFN, the UE can hand over the unicast transmission for a TMGI within one MBSFN and keep receiving the multicast transmission from TMGIs within the other MBSFNs.

At event 513, the UE synchronizes with the target cell. At event 514, assuming that the UE has already established the default EPS bearer, the unicast transmission may require a new dedicated EPS bearer to be established for receiving the MBMS service through p-t-p transmission. The UE sends a Bearer Resource Allocation request to the MME. At event 515, the MME returns an Activate Dedicated EPS Bearer Context Request. At event 516, the UE sends an RRC Connection Reconfiguration Complete message to the target eNB to indicate that the unicast bearer has been established and that MBMS delivery through p-t-p transmission can start.

Figure 6:
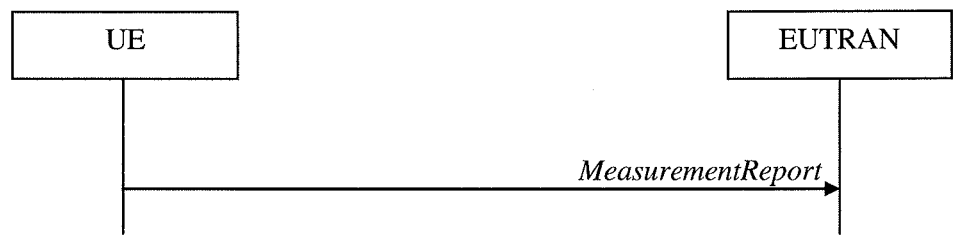
FIG. 6 is a diagram of a measurement report, according to an embodiment of the disclosure.

A modification of a measurement report by adding a TMGI of an MBMS service that the UE is receiving or is interested in receiving is shown in FIG. 6. The following is an example of wording that might be included in 3GPP Technical Standard (TS) 36.331 in order to implement such measurement reporting.

5.5.5 Measurement Reporting

The purpose of this procedure is to transfer measurement results from the UE to E-UTRAN.

For the measId for which the measurement reporting procedure was triggered, the UE shall set the measResults within the MeasurementReport message as follows:

---

1> set the measId to the measurement identity that triggered the measurement reporting;
1> set the measResultPCell to include the quantities of the PCell;
1> set the measResultServFreqList to include for each SCell that is configured, if any, within measResultSCell the quantities of the concerned SCell;
1> if the reportConfig associated with the measId that triggered the measurement reporting includes reportAddNeighMeas:
  2> for each serving frequency for which measObjectId is referenced in the measIdList, other than the frequency corresponding with the measId that triggered the measurement reporting:
    3> set the measResultServFreqList to include within measResultBestNeighCell the physCellId and the quantities of the best non-serving cell, based on RSRP, on the concerned serving frequency;
1> if there is at least one applicable neighbouring cell to report:
  2> set the measResultNeighCells to include the best neighbouring cells up to maxReportCells in accordance with the following:
    3> if the triggerType is set to event:
      4> include the cells included in the cellsTriggeredList as defined within the VarMeasReportList for this measId;
    3> else:
      4> include the applicable cells for which the new measurement results became available since the last periodical reporting or since the measurement was initiated or reset;
NOTE: The reliability of the report (i.e. the certainty it contains the strongest cells on the concerned frequency) depends on the measurement configuration i.e. the reportInterval. The related performance requirements are specified in TS 36.133 [16].
    3> for each cell that is included in the measResultNeighCells, include the physCellId;

-continued

```
    3> if the triggerType is set to event; or the purpose is set to reportStrongestCells or to
        reportStrongestCellsForSON:
        4> for each included cell, include the layer 3 filtered measured results in accordance with the
            reportConfig for this measId, ordered as follows:
            5> if the measObject associated with this measId concerns E-UTRA:
                6> set the measResult to include the quantity(ies) indicated in the reportQuantity within the
                    concerned reportConfig in order of decreasing triggerQuantity, i.e. the best cell is included
                    first;
            5> if the measObject associated with this measId concerns UTRA FDD and if
                ReportConfigInterRAT includes the reportQuantityUTRA-FDD:
                6> set the measResult to include the quantities indicated by the reportQuantityUTRA-FDD in
                    order of decreasing measQuantityUTRA-FDD within the quantityConfig, i.e. the best cell is
                    included first;
            5> if the measObject associated with this measId concerns UTRA FDD and if
                ReportConfigInterRAT does not include the reportQuantityUTRA-FDD; or
            5> if the measObject associated with this measId concerns UTRA TDD, GERAN or CDMA2000:
                6> set the measResult to the quantity as configured for the concerned RAT within
                    the quantityConfig in order of either decreasing quantity for UTRA and
                    GERAN or increasing quantity for CDMA2000 pilotStrength, i.e. the best cell
                    is included first;
    3> else if the purpose is set to reportCGI:
        4> if the mandatory present fields of the cgi-Info for the cell indicated by the
            cellForWhichToReportCGI in the associated measObject have been obtained:
            5> if the cell broadcasts a CSG identity:
                6> include the csg-Identity;
                6> include the csg-MemberStatus and set it to member if the CSG identity is included in the
                    UE's CSG whitelist;
            5> if the si-RequestForHO is configured within the reportConfig associated with this measId:
                6> include the cgi-Info containing all the fields that have been successfully acquired, except for
                    the plmn-IdentityList;
            5> else:
                6> include the cgi-Info containing all the fields that have been successfully acquired;
1> if the ue-RxTxTimeDiffPeriodical is configured within the corresponding reportConfig for this measId;
    2> set the ue-RxTxTimeDiffResult to the measurement result provided by lower layers;
    2> set the currentSFN;
1> if the includeLocationInfo is configured in the corresponding reportConfig for this measId and detailed
    location information that has not been reported is available, set the content of the locationInfo as follows:
    2> include the locationCoordinates;
    2> if available, include the gnss-TOD-msec;
1> increment the numberOfReportsSent as defined within the VarMeasReportList for this measId by 1;
1> stop the periodical reporting timer, if running;
1> if the numberOfReportsSent as defined within the VarMeasReportList for this measId is less than the
    reportAmount as defined within the corresponding reportConfig for this measId:
    2> start the periodical reporting timer with the value of reportInterval as defined within the corresponding
        reportConfig for this measId;
1> else:
    2> if the triggerType is set to periodical:
        3> remove the entry within the VarMeasReportList for this measId;
        3> remove this measId from the measIdList within VarMeasConfig;
1> if the measured results are for CDMA2000 HRPD:
    2> set the preRegistrationStatusHRPD to the UE's CDMA2000 upper layer's HRPD preRegistrationStatus;
1> if the measured results are for CDMA2000 1xRTT:
    2> set the preRegistrationStatusHRPD to FALSE;
1> if the measConfig includes tmgi-Reporting:
    2> include the tmgi-List containing the tmgi of each MBMS service the UE is currently receiving or interested
        to receive.
1> submit the MeasurementReport message to lower layers for transmission, upon which the procedure ends;
```

The IE MeasConfig specifies measurements to be performed by the UE and covers intra-frequency, inter-frequency, and inter-RAT (inter-radio access technology) mobility as well as configuration of measurement gaps. FIGS. 7a and 7b depicts examples of wording that might be included in 3GPP TS 36.331 in order to implement the MeasConfig information element.

The IE MeasResults covers measured results for intra-frequency, inter-frequency, and inter-RAT mobility. FIGS. 8a-8d depict examples of wording that might be included in 3GPP TS 36.331 in order to implement the MeasResults information element.

The following is an example of wording that might be included in 3GPP TS 36.331 in order to implement connection reconfiguration.

5.3.5.4 Reception of an RRCConnectionReconfiguration Including the mobilityControlInfo by the UE (Handover)

If the RRCConnectionReconfiguration message includes the mobilityControlInfo and the UE is able to comply with the configuration included in this message, the UE shall:

```
1> stop timer T310, if running;
1> start timer T304 with the timer value set to t304, as included in the mobilityControlInfo;
```

1> if the carrierFreq is included:
    2> consider the target PCell to be one on the frequency indicated by the carrierFreq with a physical cell identity indicated by the targetPhysCellId;
1> else:
    2> consider the target PCell to be one on the frequency of the source PCell with a physical cell identity indicated by the targetPhysCellId;
1> start synchronising to the DL of the target PCell;
NOTE 1: The UE should perform the handover as soon as possible following the reception of the RRC message triggering the handover, which could be before confirming successful reception (HARQ and ARQ) of this message.
1> reset MAC;
1> re-establish PDCP for all RBs that are established;
NOTE 2: The handling of the radio bearers after the successful completion of the PDCP re-establishment, e.g. the re-transmission of unacknowledged PDCP SDUs (as well as the associated status reporting), the handling of the SN and the HFN, is specified in TS 36.323 [8].
1> re-establish RLC for all RBs that are established;
1> configure lower layers to consider the SCell(s), if configured, to be in deactivated state;
1> apply the value of the newUE-Identity as the C-RNTI;
1> if the RRCConnectionReconfiguration message includes the fullConfig:
    2> perform the radio configuration procedure as specified in section 5.3.5.8;
1> configure lower layers in accordance with the received radioResourceConfigCommon;
1> configure lower layers in accordance with any additional fields, not covered in the previous, if included in the received mobilityControlInfo;
1> if the RRCConnectionReconfiguration message includes the radioResourceConfigDedicated:
    2> perform the radio resource configuration procedure as specified in 5.3.10;
1> if the keyChangeIndicator received in the securityConfigHO is set to TRUE:
    2> update the $K_{eNB}$ key based on the fresh $K_{ASME}$ key taken into use with the previous successful NAS SMC procedure, as specified in TS 33.401 [32];
1> else:
    2> update the $K_{eNB}$ key based on the current $K_{eNB}$ or the NH, using the nextHopChainingCount value indicated in the securityConfigHO, as specified in TS 33.401 [32];
1> store the nextHopChainingCount value;
1> if the securityAlgorithmConfig is included in the securityConfigHO:
    2> derive the $K_{RRCint}$ key associated with the integrityProtAlgorithm, as specified in TS 33.401 [32];
    2> derive the $K_{RRCenc}$ key and the $K_{UPenc}$ key associated with the cipheringAlgorithm, as specified in TS 33.401 [32];
1> else:
    2> derive the $K_{RRCint}$ key associated with the current integrity algorithm, as specified in TS 33.401 [32];
    2> derive the $K_{RRCenc}$ key and the $K_{UPenc}$ key associated with the current ciphering algorithm, as specified in TS 33.401 [32];
1> configure lower layers to apply the integrity protection algorithm and the $K_{RRCint}$ key, i.e. the integrity protection configuration shall be applied to all subsequent messages received and sent by the UE, including the message used to indicate the successful completion of the procedure;
1> configure lower layers to apply the ciphering algorithm, the $K_{RRCenc}$ key and the $K_{UPenc}$ key, i.e. the ciphering configuration shall be applied to all subsequent messages received and sent by the UE, including the message used to indicate the successful completion of the procedure;
1> if the received RRCConnectionReconfiguration includes the sCellToReleaseList:
    2> perform SCell release as specified in 5.3.10.3a;
1> if the received RRCConnectionReconfiguration includes the sCellToAddModList:
    2> perform SCell addition or modification as specified in 5.3.10.3b;
1> perform the measurement related actions as specified in 5.5.6.1;
1> if the RRCConnectionReconfiguration message includes the measConfig:
    2> perform the measurement configuration procedure as specified in 5.5.2;
1> perform the measurement identity autonomous removal as specified in 5.5.2.2a;
1> release reportProximityConfig and clear any associated proximity status reporting timer;
1> if the RRCConnectionReconfiguration message includes the reportProximityConfig:
    2> perform the proximity indication in accordance with the received reportProximityConfig;
1> if the measConfig includes tmgi-Reporting:
    2> receive the tmgi-List containing the tmgi of each MBMS service the target cell can provide in p-t-m transmission
1> set the content of RRCConnectionReconfigurationComplete message as follows:
    2> if the UE has logged measurements available for E-UTRA and plmn-Identity stored in VarLogMeasReport is equal to the RPLMN:
        3> include the logMeasAvailable and set it to true;
1> submit the RRCConnectionReconfigurationComplete message to lower layers for transmission;
1> if MAC successfully completes the random access procedure:
    2> stop timer T304;
    2> apply the parts of the CQI reporting configuration, the scheduling request configuration and the sounding RS configuration that do not require the UE to know the SFN of the target PCell, if any;
    2> apply the parts of the measurement and the radio resource configuration that require the UE to know the SFN of the target PCell (e.g. measurement gaps, periodic CQI reporting, scheduling request configuration, sounding RS configuration), if any, upon acquiring the SFN of the target PCell;
NOTE 3: Whenever the UE shall setup or reconfigure a configuration in accordance with a field that is received it applies the new configuration, except for the cases addressed by the above statements.
    2> the procedure ends;
NOTE 4: The UE is not required to determine the SFN of the target PCell by acquiring system information from that cell before performing RACH access in the target PCell.

The IE MobilityControlInfo includes parameters relevant for network controlled mobility to and within E-UTRA. The MobilityControlInfo IE in the RRC Connection Reconfiguration message is modified to include the TMGIs of the MBMS services that the target cell can provide to the UE through p-t-m transmission, which could be all or part of the TMGIs that the source cell received from the UE in the measurement report. When no TMGI is included, the target cell does not provide the MBMS service that the UE is receiving or is interested in receiving. FIG. 9 depicts examples of wording that might be included in 3GPP TS 36.331 in order to implement the MobilityControlInfo information element.

The source eNB does not know the status of the MBSFNs and TMGIs in the neighboring eNBs. If an individual cell is allowed to join and leave an MBSFN in the future, each cell may need to report the change of its MBSFN membership status to the MCE and/or the MME through a new MBMS report message. Currently, it is assumed that MBMS service termination through an MBMS Session Stop Request is valid for all cells in the MBSFN, and no MBMS report is necessary.

Another alternative is for the MCE to tell each eNB under its domain the MBSFN/TMGI status of every other eNB under the domain, using a new MBSFN Information broadcast message, after completion of an MBMS service initialization. Each eNB might selectively store the received information relevant to its neighbor eNBs only. If an individual cell is allowed to join and leave an MBSFN in the future, the MBSFN Information message might be re-broadcast upon the completion of the MBSFN modification. This broadcast could be based only on the updated information. Currently, it is assumed that MBMS service termination through an MBMS Session Stop Request is valid for all cells in the MBSFN, and no MBSFN Information re-broadcast is necessary.

Figure 10:
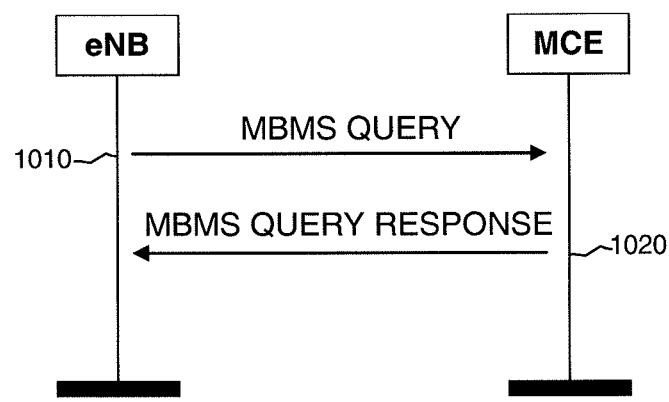
FIG. 10 is a diagram of an MBMS query procedure, according to an embodiment of the disclosure.

The MBMS query procedures allow the serving cell to query the MCE to know whether the neighboring eNBs provide the MBMS services relevant to the TMGIs included in the MBMS Query message. FIG. 10 illustrates an embodiment of successful operation of an MBMS query procedure. The eNB initiates the procedure at event 1010 by sending an MBMS Query message to the MCE, including the TMGIs that come from the UE. The MCE matches the received TMGIs with its database entries relating the eNB and the TMGIs that each eNB provides. If there is a match, the MCE sends the matching eNBs that are in the proximity of the querying eNB to the querying eNB through an MBMS Query Response at event 1020. The querying eNB selects the best eNB among the matching eNBs returned in the MBMS Query Response based on the measurement results. It is possible that MCE finds no matching eNB that provides MBMS services relevant to the received TMGIs. In this case, the MBMS Query Response will return no eNB.

FIG. 11 illustrates information that might be present in the MBMS Query message sent by the eNB to the MCE to query the MBSFN status of its neighboring eNBs relevant to the TMGIs. The MCE knows the querying eNB from the MCE MBMS M2AP ID and eNB MBMS M2AP ID. The TMGIs are included in the measurement report that comes from the UE. FIG. 12 illustrates information that might be present in the query response that is sent by the MCE to respond to the MBMS query message.

If none of the neighboring eNBs are part of the MBSFN (that is, if the MBMS query response does not return any neighbor eNBs), the serving eNB may decide to hand the UE over to the strongest cell and to continue MBMS services through p-t-p transmission. This might require the target eNB to join the MBMS multicast from the BM-SC. The source eNB can provide the IP multicast address for the target cell to join. FIG. 13 illustrates information that might be present in the Handover Required message that is sent by the source eNB to the MME to request the preparation of resources at the target. FIG. 14 illustrates information that might be present in the Handover Request message that is sent by the MME to the target eNB to request the preparation of resources.

The newly received neighbor eNB information from the MCE or MME is used to update the stored neighbor eNB information in the source eNB and is then forwarded to the target eNB to update the neighbor eNB information in the target eNB. The forwarding of the neighbor eNB information can be included in the Handover Required and Handover Request or in an X2AP new message. The examples in FIGS. 13 and 14 use Handover Required and Handover Request to transport the neighbor eNB information to the target cell.

In summary, a source cell is not able to select a target cell that has a similar MBMS service that a UE is currently receiving, in order to provide continuity of MBMS services to the UE, because the source cell does not know the MBMS services and their corresponding MBSFNs/TMGIs that the UE is receiving and it does not know the MBSFNs/TMGIs of the neighboring cells. Only the UE knows what it is receiving and the MME or MCE knows the information about neighboring cells. The embodiments described herein allow the source eNB to know which neighboring eNBs are part of the MBSFNs/TMGIs that provide the same MBMS services, so the source eNB can hand over the UE to the appropriate target eNB. If the UE is at the edge of an MBSFN and the neighboring cell does not provide the same MBMS services, the source eNB can add more robust p-t-p transmission to deliver the MBMS service in the current serving cell and combine the p-t-m and p-t-p MBMS transmissions for error-free MBMS content in the RLC layer before subsequent potential p-t-p handover to a target cell. Alternatively, the source eNB can hand over the p-t-m MBMS service as a p-t-p MBMS service in the target eNB, so MBMS service continuity can be achieved. If more than one MBSFN overlaps in a cell and if the UE can receive MBMS services from more than one MBSFN, the UE can hand over some of the MBMS services with their corresponding TMGIs in a unicast transmission and hand over the rest of the MBMS services with their corresponding TMGIs in a multicast transmission.

Figure 15:
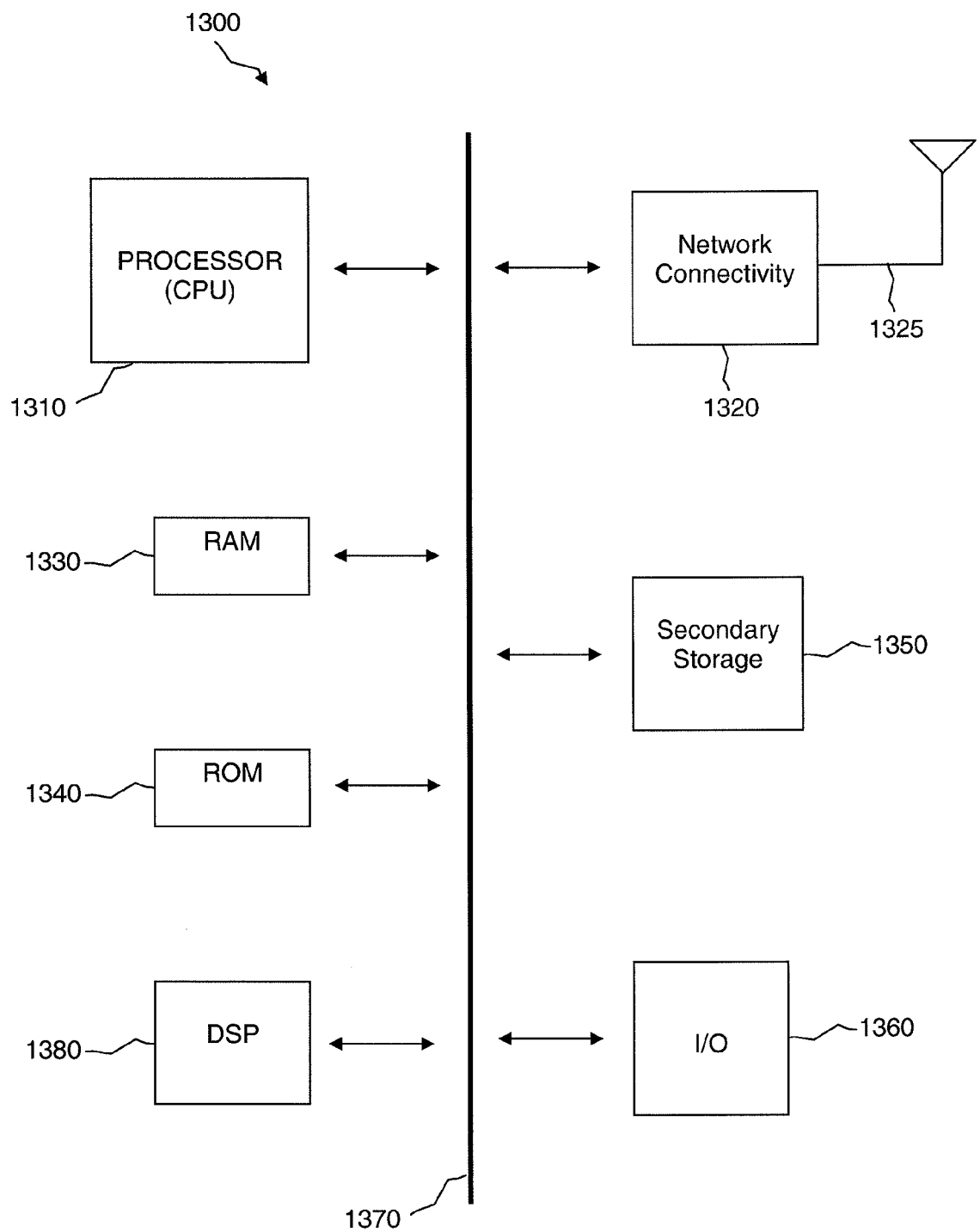
FIG. 15 illustrates a processor and related components suitable for implementing the several embodiments of the present disclosure.

The UE 10, eNB 20, and MCE 110 of FIG. 1 and other components that might be associated with the cells 102 may include a processing component that is capable of executing instructions related to the actions described above. FIG. 15 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method is provided for a UE to continue to receive an MBMS. The method includes, when the UE initiates a handover from a first cell that is providing the MBMS, the UE adding a TMGI associated with the MBMS service to a message sent from the UE to an access node in the first cell. The method further includes the UE receiving information from the access node in the first cell, the information promoting the UE being handed over to a second cell capable of providing the MBMS.

In another embodiment, a UE is provided. The UE includes a processor configured such that, when the UE initiates a handover from a first cell that is providing an MBMS to the UE, the UE adds a TMGI associated with the MBMS service to a message sent from the UE to an access node in the first cell. The processor is further configured such the UE receives information from the access node in the first cell, the information promoting the UE being handed over to a second cell capable of providing the MBMS.

In another embodiment, a method is provided for continuing transmission of an MBMS. The method includes an access node in a first cell receiving, in a message from a UE, a TMGI associated with the MBMS. The method further includes the access node attempting to identify at least one neighboring cell capable of providing the MBMS associated with the TMGI. The method further includes the access node providing information to the UE usable by the UE for handover to a target cell based on the target cell's signal quality relative to the signal quality among the identified cells capable of providing the MBMS.

In another embodiment, an access node is provided. The access node includes a processor configured such that the access node receives, in a message from a UE, a TMGI associated with an MBMS being received by the UE. The processor is further configured such that the access node attempts to identify at least one neighboring cell capable of providing the MBMS associated with the TMGI. The processor is further configured such that the access node provides information to the UE usable by the UE for handover to a target cell based on the target cell's signal quality relative to the signal quality among the identified cells capable of providing the MBMS.

In another embodiment, a method is provided for continuing transmission of an MBMS. The method includes a network component receiving, in a message from an access node in a source cell, a first TMGI associated with the MBMS. The method further includes the network component comparing the first TMGI to a plurality of TMGIs associated with a plurality of MBMSs, the plurality of MBMSs known by the network component to be available in at least one neighboring cell of the source cell. The method further includes the network component providing the access node with information related to at least one neighboring cell in which the MBMS is available, the information usable by the access node in initiating a handover of a user equipment to a target cell.

In another embodiment, a network component is provided. The network component includes a processor configured such that the network component receives, in a message from an access node in a source cell, a first TMGI associated with an MBMS. The processor is further configured such that the network component compares the first TMGI to a plurality of TMGIs associated with a plurality of MBMSs, the plurality of MBMSs known by the network component to be available in at least one neighboring cell of the source cell. The processor is further configured such that the network component provides the access node with information related to at least one neighboring cell in which the MBMS is available, the information usable by the access node in initiating a handover of a user equipment to a target cell.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for operating a user equipment (UE) configured to support a multimedia broadcast multicast service (MBMS), the method comprising:
   transmitting, by the UE to an access node in a source cell associated with a group of neighboring cells, a message indicating an MBMS service associated with a multicast-broadcast single-frequency network (MBSFN); and
   receiving, by the UE from the access node, information promoting a handover of the UE to a target cell,
      wherein, when no cell in the group belongs to the MBSFN and exceeds a signal quality threshold, the target cell is the cell in the group with the highest signal quality and the MBMS service is continued in the target cell via point-to-point (p-t-p) transmission, and
      wherein, when the message comprises an MBMS priority information element (IE) indicating that the MBMS service is not a priority, the target cell is the cell in the group with the highest signal quality.

2. The method of claim 1, wherein, when a sub-group of at least one cell in the group belongs to the MBSFN and exceeds the signal quality threshold, the target cell is the cell in the sub-group with the highest signal quality and the MBMS service is continued in the target cell via point-to-multipoint (p-t-m) transmission.

3. The method of claim 1, wherein the message is a measurement report.

4. The method of claim 1, wherein, when the message comprises an MBMS priority information element (IE) indicating that the MBMS service is a priority, and when a sub-group of at least one cell in the group belongs to the MBSFN, the target cell is the cell in the sub-group with the highest signal quality and the MBMS service is continued in the target cell via point-to-multipoint (p-t-m) transmission.

5. The method of claim 1, wherein, when the message comprises the MBMS priority IE indicating that the MBMS service is not a priority and when the target cell is not in the MBSFN, the MBMS service is continued in the target cell via p-t-p transmission.

6. The method of claim 1, wherein, when the UE is on an emergency call, the UE is handed over to a cell with the best signal quality without regard to the capability of the cell with the best signal quality to provide the MBMS.

7. The method of claim 1, wherein, when the UE is on a voice call, the UE is handed over to a cell with the best signal quality without regard to the capability of the cell with the best signal quality to provide the MBMS.

8. A user equipment (UE) configured to support a multimedia broadcast multicast service (MBMS), the UE comprising a processor configured to:
   transmit, to an access node in a source cell associated with a group of neighboring cells, a message indicating an MBMS service associated with a multicast-broadcast single-frequency network (MBSFN); and
   receive, from the access node, information promoting a handover of the UE to a target cell,
      wherein, when no cell in the group belongs to the MBSFN and exceeds a signal quality threshold, the target cell is the cell in the group with the highest signal quality and the MBMS service is continued in the target cell via point-to-point (p-t-p) transmission, and
      wherein, when the message comprises an MBMS priority information element (IE) indicating that the MBMS service is not a priority, the target cell is the cell in the group with the highest signal quality.

9. The UE of claim 8, wherein, when a sub-group of at least one cell in the group belongs to the MBSFN and exceeds the signal quality threshold, the target cell is the cell in the sub-group with the highest signal quality and the MBMS service is continued in the target cell via point-to-multipoint (p-t-m) transmission.

10. The UE of claim 8, wherein the message is a measurement report.

11. The UE of claim 8, wherein, when the message comprises an MBMS priority information element (IE) indicating that the MBMS service is a priority, and when a sub-group of at least one cell in the group belongs to the MBSFN, the target cell is the cell in the sub-group with the highest signal quality and the MBMS service is continued in the target cell via point-to-multipoint (p-t-m) transmission.

12. The UE of claim 8, wherein, when the message comprises the MBMS priority IE indicating that the MBMS service is not a priority and when the target cell is in the MBSFN, the MBMS service is continued in the target cell via point-to-multipoint (p-t-m) transmission.

13. The UE of claim 8, wherein, when the UE is on an emergency call, the UE is handed over to a cell with the best signal quality without regard to the capability of the cell with the best signal quality to provide the MBMS.

14. The UE of claim 8, wherein, when the UE is on a voice call, the UE is handed over to a cell with the best signal quality without regard to the capability of the cell with the best signal quality to provide the MBMS.

15. A method for operating an access node in a source cell associated with a group of neighboring cells and configured to support a multimedia broadcast multicast service (MBMS), the method comprising:
   receiving, by the access node from a user equipment (UE), a message indicating an MBMS service associated with a multicast-broadcast single-frequency network (MBSFN); and
   transmitting, by the access node to the UE, information promoting a handover of the UE to a target cell,
      wherein, when no cell in the group belongs to the MBSFN and exceeds a signal quality threshold, the target cell is the cell in the group with the highest signal quality and the MBMS service is continued in the target cell via point-to-point (p-t-p) transmission, and
      wherein, when the message comprises an MBMS priority information element (IE) indicating that the MBMS service is not a priority, the target cell is the cell in the group with the highest signal quality.

16. The method of claim 15, wherein, when a sub-group of at least one cell in the group belongs to the MBSFN and exceeds the signal quality threshold, the target cell is the cell in the sub-group with the highest signal quality and the MBMS service is continued in the target cell via point-to-multipoint (p-t-m) transmission.

17. The method of claim 15, wherein the message is a measurement report.

18. The method of claim 15, wherein, when the message comprises an MBMS priority information element (IE) indicating that the MBMS service is a priority, and when a subgroup of at least one cell in the group belongs to the MBSFN, the target cell is the cell in the sub-group with the highest signal quality and the MBMS service is continued in the target cell via point-to-multipoint (p-t-m) transmission.

19. The method of claim 15, wherein, when the message comprises the MBMS priority IE indicating that the MBMS service is not a priority and when the target cell is not in the MBSFN, the MBMS service is continued in the target cell via p-t-p transmission.

20. An access node configured to support multimedia broadcast multicast service (MBMS), the access node comprising a processor configured such that the access node:
  receives a message from a user equipment (UE), wherein the message is indicative of at least one MBMS service of interest;
  attempts to identify at least one neighboring cell capable of providing the MBMS service, wherein the attempt is at least one of:
    a query from the access node to a network component that has knowledge of which cells neighboring the first cell are providing the MBMS, the query requesting the network component to return to the access node an identity of at least one neighboring cell that is providing the MBMS,
    a query from the access node directly to a neighboring access node to determine whether a cell associated with the neighboring access node is capable of providing the MBMS, or
    a retrieval from storage by the access node of an identity of at least one neighboring cell that is providing the MBMS, the identity having been previously placed in storage after being received from the network component in response to a query from the access node for the identity; and
  provides information to the UE,
    wherein the information is indicative of one or more MBMS services which a second cell is capable of providing, and
    wherein the access node updates the stored identity after receiving from the network component query results regarding neighboring cells that can provide the MBMS or after receiving from a neighboring access node an indication that a cell associated with the neighboring access node is capable of providing the MBMS.

21. The access node of claim 20, wherein the access node deletes the stored identity based on at least one of:
  an expiration of a timer;
  the access node deactivating membership in a multicast/broadcast single frequency network associated with the MBMS; and
  an expiration of an MBMS duration set during session start.

22. An access node configured to support multimedia broadcast multicast service (MBMS), the access node comprising a processor configured such that the access node:
  receives a message from a user equipment (UE), wherein the message is indicative of at least one MBMS service of interest;
  attempts to identify at least one neighboring cell capable of providing the MBMS service, wherein the attempt is at least one of:
    a query from the access node to a network component that has knowledge of which cells neighboring the first cell are providing the MBMS, the query requesting the network component to return to the access node an identity of at least one neighboring cell that is providing the MBMS,
    a query from the access node directly to a neighboring access node to determine whether a cell associated with the neighboring access node is capable of providing the MBMS, or
    a retrieval from storage by the access node of an identity of at least one neighboring cell that is providing the MBMS, the identity having been previously placed in storage after being received from the network component in response to a query from the access node for the identity; and
  provides information to the UE,
    wherein the information is indicative of one or more MBMS services which a second cell is capable of providing, and
    wherein, after receiving from the network component query results regarding neighboring cells that can provide the MBMS, and after selecting a target cell, the access node forwards the query results to the target cell.

23. An access node configured to support multimedia broadcast multicast service (MBMS), the access node comprising a processor configured such that the access node:
  receives a message from a user equipment (UE), wherein the message is indicative of at least one MBMS service of interest;
  attempts to identify at least one neighboring cell capable of providing the MBMS service, wherein the attempt is at least one of:
    a query from the access node to a network component that has knowledge of which cells neighboring the first cell are providing the MBMS, the query requesting the network component to return to the access node an identity of at least one neighboring cell that is providing the MBMS,
    a query from the access node directly to a neighboring access node to determine whether a cell associated with the neighboring access node is capable of providing the MBMS, or
    a retrieval from storage by the access node of an identity of at least one neighboring cell that is providing the MBMS, the identity having been previously placed in storage after being received from the network component in response to a query from the access node for the identity; and
  provides information to the UE,
    wherein the information is indicative of one or more MBMS services which a second cell is capable of providing, and
    wherein the access node hands the UE over to a target cell that has the best signal but that does not provide the MBMS upon the occurrence of at least one of:
      the access node not receiving from the network component an identity of a cell that can provide the MBMS;
      the access node not receiving from a neighboring access node an indication that the cell associated with the neighboring access node is capable of providing the MBMS; and
      the UE being involved in a voice call that has a higher priority than the MBMS.

24. The access node of claim 23, wherein the handoff procedure includes a request of the target cell to join an MBMS Internet Protocol multicast.

25. A method for operating a network component configured to support a multimedia broadcast multicast service (MBMS), the method comprising:
receiving, by the network component from an access node in a source cell associated with a group of neighboring cells, a message indicating an MBMS service associated with a multicast-broadcast single-frequency network (MBSFN); and
transmitting, by the network component to the access node, information promoting a handover of a user equipment (UE) to a target cell,
wherein, when no cell in the group belongs to the MBSFN and exceeds a signal quality threshold, the target cell is the cell in the group with the highest signal quality and the MBMS service is continued in the target cell via point-to-point (p-t-p) transmission, and
wherein, when the message comprises an MBMS priority information element (IE) indicating that the MBMS service is a priority, and when a sub-group of at least one cell in the group belongs to the MBSFN, the target cell is the cell in the sub-group with the highest signal quality and the MBMS service is continued in the target cell via point-to-multipoint (p-t-m) transmission.

26. The method of claim 25, wherein, when a sub-group of at least one cell in the group belongs to the MBSFN and exceeds the signal quality threshold, the target cell is the cell in the sub-group with the highest signal quality and the MBMS service is continued in the target cell via point-to-multipoint (p-t-m) transmission.

27. A network component configured to support multimedia broadcast multicast service (MBMS), the network component comprising a processor configured to:
receive, from an access node in a source cell associated with a group of neighboring cells, a message indicating an MBMS service associated with a multicast-broadcast single-frequency network (MBSFN); and
transmit, to the access node, information promoting a handover of a user equipment (UE) to a target cell,
wherein, when no cell in the group belongs to the MBSFN and exceeds a signal quality threshold, the target cell is the cell in the group with the highest signal quality and the MBMS service is continued in the target cell via point-to-point (p-t-p) transmission, and
wherein, when the message comprises an MBMS priority information element (IE) indicating that the MBMS service is not a priority, the target cell is the cell in the group with the highest signal quality.

28. The network component of claim 27, wherein, when the message comprises the MBMS priority IE indicating that the MBMS service is not a priority and when the target cell is not in the MBSFN, the MBMS service is continued in the target cell via p-t-p transmission.

* * * * *